United States Patent
Hakkaku et al.

(10) Patent No.: US 10,391,754 B2
(45) Date of Patent: Aug. 27, 2019

(54) FORMING APPARATUS AND FORMING METHOD

(71) Applicant: MIMAKI ENGINEERING CO., LTD., Nagano (JP)

(72) Inventors: Kunio Hakkaku, Nagano (JP); Kazuhiro Ochi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 360 days.

(21) Appl. No.: 15/287,726

(22) Filed: Oct. 6, 2016

(65) Prior Publication Data
US 2017/0100896 A1 Apr. 13, 2017

(30) Foreign Application Priority Data

Oct. 8, 2015 (JP) ................................. 2015-200419
Jun. 2, 2016 (JP) ................................. 2016-111019

(51) Int. Cl.
*B29C 67/00* (2017.01)
*B33Y 10/00* (2015.01)
(Continued)

(52) U.S. Cl.
CPC ............ *B33Y 10/00* (2014.12); *B29C 64/112* (2017.08); *B29C 64/386* (2017.08); *B29C 64/40* (2017.08);
(Continued)

(58) Field of Classification Search
CPC ......... B33Y 10/00; B33Y 30/00; B33Y 50/00; B33Y 50/02; B29C 64/112; B29C 64/227; B29C 64/232; B29C 64/393
(Continued)

(56) References Cited

U.S. PATENT DOCUMENTS

| | | | | |
|---|---|---|---|---|
| 2012/0225208 | A1* | 9/2012 | Tanaka | B41J 2/14016 427/265 |
| 2014/0374949 | A1* | 12/2014 | Toh | B29C 67/0088 264/241 |
| 2015/0231827 | A1* | 8/2015 | Uzan | B29C 67/0085 425/375 |

FOREIGN PATENT DOCUMENTS

| | | |
|---|---|---|
| EP | 2500110 | 9/2012 |
| JP | 2013536771 | 9/2013 |

(Continued)

OTHER PUBLICATIONS

"Office Action of European Counterpart Application", dated Mar. 3, 2017, p. 1-p. 7, in which the listed references were cited.
(Continued)

*Primary Examiner* — Joseph S Del Sole
*Assistant Examiner* — Lawrence D. Hohenbrink, Jr.
(74) *Attorney, Agent, or Firm* — JCIPRNET

(57) ABSTRACT

A forming apparatus for forming a three-dimensional object is provided. The forming apparatus includes: a data storage, storing multiple pieces of slice data; a discharge head, discharging a forming material; a forming platform; a main scan driver, i.e., a first direction scan driver, driving the discharge head to perform a main scan as a first direction scan; and a material-accumulating direction driver, changing a head-platform distance between the discharge head and the forming platform. The main scan driver, based on a respective one of the multiple pieces of slice data, drives the discharge head to perform a plurality of the main scans at the same position in the three-dimensional object currently formed.

15 Claims, 7 Drawing Sheets

(51) Int. Cl.
*B33Y 30/00* (2015.01)
*B33Y 50/02* (2015.01)
*B29C 64/112* (2017.01)
*B29C 64/386* (2017.01)
*B29C 64/40* (2017.01)
*B29C 64/227* (2017.01)
*B29C 64/232* (2017.01)
*B29C 64/393* (2017.01)
*B33Y 50/00* (2015.01)

(52) U.S. Cl.
CPC ............... *B33Y 30/00* (2014.12); *B33Y 50/02* (2014.12); *B29C 64/227* (2017.08); *B29C 64/232* (2017.08); *B29C 64/393* (2017.08); *B33Y 50/00* (2014.12)

(58) Field of Classification Search
USPC ............................... 264/308; 425/375, 174.4
See application file for complete search history.

(56) References Cited

FOREIGN PATENT DOCUMENTS

| | | |
|---|---|---|
| JP | 2015009509 | 1/2015 |
| WO | 2015125128 | 8/2015 |

OTHER PUBLICATIONS

"Office Action of Japan Counterpart Application," dated Mar. 12, 2019, with English translation thereof, p. 1-p. 7.

\* cited by examiner

FORMING APPARATUS AND FORMING METHOD

CROSS REFERENCE TO RELATED APPLICATIONS

This application claims the priority benefits of Japanese Patent Application No. 2015-200419, filed on Oct. 8, 2015 and Japanese Patent Application No. 2016-111019, filed on Jun. 2, 2016. The entirety of each of the above-mentioned patent applications is hereby incorporated by reference herein and made a part of this specification.

TECHNICAL FIELD

This disclosure relates to a forming apparatus and a faulting method.

DESCRIPTION OF THE BACKGROUND ART

Conventionally, inkjet printers configured to carry out a printing operation using inkjet printing technique are employed in a broad range of applications (for example, see the Non-Patent Literature 1 for details). There are ongoing discussions in recent years on the use of inkjet heads for forming three-dimensional objects (formed articles) using forming apparatuses (3D printers) (inkjet forming method). Such apparatuses with inkjet heads employ inkjet lamination technique to form three-dimensional objects, in which inks discharged from inkjet heads are deposited to form multiple ink layers.

Non-Patent Literature 1: Internet URL http://www.mimaki.co.jp

SUMMARY

To form a three-dimensional object, the lamination technique may form each ink layer correspondingly to slice data that represents a cross-sectional shape of the three-dimensional object. Optionally, the pieces of slice data respectively representing cross-sectional shapes at different positions in the object may be used. The ink layers are formed based on the pieces of the slice data and stacked on one another. The forming operation, upon completion of each one of the ink layers, increases a distance between the inkjet heads and a forming platform supporting a three-dimensional object currently formed by a dimension equal to the thickness of one ink layer.

However, by thus forming and stacking the ink layers, a stepped part as large in height as the thickness of one ink layer may be produced at a position in each layer between overlapping parts of the ink layers that differ in size. Such stepped parts may consequently appear as periodic patterns in the form of contour lines (streaks), for example, on the curved surface of a three-dimensional object.

The conventionally employed methods of forming three-dimensional objects by thus stacking the ink layers, therefore, may inevitably degrade the quality of formed objects. For that reason, it has been a long-awaited goal to develop more appropriate methods of forming three-dimensional objects. To this end, this disclosure is directed to providing a forming apparatus and a forming method that may offer solutions to the described problem with the known art.

The inventors of this application, through various researches and studies, have conceived the idea of forming a three-dimensional object in an approach different from the ink layer-based forming methods for three-dimensional objects. Specifically, the distance between the forming platform and the inkjet heads, instead of being changed upon completion of each ink layer, is changed during the forming operation corresponding to one piece of the slice data. This approach has been found to be effective in the pursuit of preventing the contour-like patterns from appearing on the surface of a three-dimensional object. To address the problem with the known art, this disclosure provides for configurations described below.

[Configuration 1]

A forming apparatus for forming a three-dimensional object is provided. The forming apparatus includes:

a data storage which stores slice data, the slice data representing a cross-sectional shape of a three-dimensional object to be formed;

a discharge head that discharges a forming material;

a forming platform disposed at a position so as to face the discharge head, the forming platform being a member in the form of a table that supports the three-dimensional object currently formed;

a first direction scan driver that drives the discharge head to perform a first direction scan in which the discharge head, while discharging the forming material, moves relative to the forming platform in a first direction previously set; and a material-accumulating direction driver that moves at least one of the forming platform and the discharge head in a material-accumulating direction to change a head-platform distance between the discharge head and the forming platform, the material-accumulating direction being a direction in which the forming material discharged from the discharge head is accumulated in layers.

The data storage is capable of storing a plurality of pieces of the slice data that respectively represent cross-sectional shapes at different positions in the three-dimensional object in the material-accumulating direction.

The first direction scan driver is configured to drive the discharge head to perform a plurality of the first direction scans at the same position in the three-dimensional object currently formed based on a respective one of the pieces of the slice data.

The material-accumulating direction driver is configured to move at least one of the forming platform and the discharge head so as to increase the head-platform distance at least at any one of timings during the plurality of the first direction scans performed at the same position based on one of the pieces of the slice data.

In the forming operation performed based on one piece of slice data, the forming apparatus thus characterized may perform plural first direction scans at each of the positions and also perform a scan to change the head-platform distance in the material-accumulating direction at a point in time during the plural first direction scans performed. Thus, a three-dimensional object may be formed in a manner different from the conventional methods in which the distance between the forming platform and the inkjet heads is changed upon completion of each one of the ink layers.

Additionally, the distance between the forming platform and the inkjet heads may be changed at a point in time during the forming operation for one piece of slice data. In contrast to the conventional forming methods, therefore, a portion formed based on one piece of slice data may have fine projections and depressions lower in height than the stepped parts of the known art. In fact, it is fine and discontinuous projections and depressions that may be formed, instead of the continuous stepped parts each formed by one ink layer as in the known art. Such fine projections and depressions are much less noticeable than the stepped parts of the known art, barely affecting the visual impression of the formed three-dimensional object.

Thus, the forming apparatus may form a three-dimensional object through such a novel approach different from the conventional methods in which a scan is performed for each ink layer in the material-accumulating direction, thereby avoiding the periodic contour-like patterns conventionally generated correspondingly to the ink layer thicknesses. The apparatus may properly avoid the risk of forming such large stepped parts as in the known art, allowing a high-quality forming operation to be more successfully carried out.

At least at any one of timings during the plurality of the first direction scans performed may refer to an optional timing between the start of a first one and the finish of a last one among the plural first direction scans performed based on one piece of slice data. More specifically, this timing may refer to a point in time between two consecutive ones of the first direction scans, or may refer to a point in time during the first direction scan performed.

Changing the head-platform distance may include changing a substantive head-platform distance. The substantive head-platform distance may be a distance corresponding to a height at which the forming material is leveled. When the forming material is leveled in a part of the first direction scans alone, the substantive head-platform distance may be a head-platform distance exclusive of a distance by which the three-dimensional object and a leveler are moved away from each other during the first direction scans not including the material leveling (leveling clearance).

When the forming material is leveled solely in the first direction scans performed in one direction included in the first direction, the first direction scan driver may preferably drive the discharge head to perform the plurality of the first direction scans in which the discharge head only moves in the one direction included in the first direction at the same position of the three-dimensional object currently formed based on one of the pieces of the slice data. In this instance, the material-accumulating direction driver may move at least one of the forming platform and the discharge head so as to increase the head-platform distance at least at any one of timings during the plurality of the first direction scans performed in the one direction at the same position based on one of the pieces of the slice data.

Driving the discharge head to perform the plural first direction scans at the same position in the three-dimensional object may include prompting the discharge head to perform the plural first direction scans so as to have the discharge head pass over the same position multiple times. In the perspective of voxels (three-dimensional pixels), therefore, the discharge head may discharge the forming material at different voxel positions in each of the first direction scans.

In this instance, the material-accumulating direction may be a direction orthogonal to the first direction. The direction in which the forming material discharged from the discharge head is accumulated in layers may refer to a direction in which the forming material discharged based on different pieces of slice data is accumulated in layers. The material-accumulating direction may be a direction parallel to a direction in which the forming material is discharged from the discharge head.

The discharge head may be an inkjet head that discharges the forming material by inkjet printing technique. In this instance, the discharge head may have a nozzle array having a plurality of nozzles arranged in a nozzle array direction unparalleled to the first direction.

The slice data may be data containing three-dimensional information of the three-dimensional object that represents its cross-sectional shapes at different positions in the material-accumulating direction. The respective pieces of slice data may be data that specifies positions in cross section of the three-dimensional object at which voxels (three-dimensional pixels) should be formed.

The forming apparatus may further include a second direction scan driver that moves the discharge head relative to the forming platform in a second direction orthogonal to the first direction. The forming apparatus thus further characterized may drive the discharge head to perform a second direction scan in which the discharge head relatively moves in the second direction at an interval between the first direction scans to change a target region of the forming material discharged from the discharge head. The first direction scan and the second direction scan may be iteratively performed, with a scan being performed in the material-accumulating direction at an interval between the first and second direction scans. Thus, the forming operation for each one of pieces of slice data may be carried out. By controlling the forming operation for each of plural pieces of slice data, the three-dimensional object may be formed based on plural pieces of slice data.

[Configuration 2]

The material-accumulating direction driver may change the head-platform distance in at least two optional first direction scans among the plurality of the first direction scans performed at the same position based on one of the pieces of the slice data, so that the head-platform distance in one of the two optional first direction scans performed later than the other is greater by a preset distance than the head-platform distance in the other one of the two optional first direction scans performed earlier than the other. This may allow the head-platform distance to suitably change while performing the plurality of the first direction scans at the same position based on one piece of slice data.

Changing the head-platform distance in two of the plural first direction scans may include changing the head-platform distance between the finish of an earlier one of the first direction scans and the start of a subsequent one of the first direction scans. The material-accumulating direction driver may change the head-platform distance in at least two or more of the plurality of the first direction scans performed at the same position based on one of the pieces of the slice data, so that the head-platform distance increases by a preset distance after each of the at least two of the plurality of the first direction scans is performed. This may allow the fine projections and depressions to be more favorably formed. When the forming material is leveled solely in the first direction scans performed in one direction included in the first direction, the discharge head may move in the one direction included in the first direction in these two first direction scans.

[Configuration 3]

The forming apparatus may further include a leveler that levels the forming material discharged from the discharge head in the first direction scan to level out the forming material to a preset height. The leveler levels the forming material discharged in at least a part of the plurality of the first direction scans performed at the same position based on one of the pieces of the slice data.

This may accurately uniform the height of the forming material. As a result, a high-quality forming operation may be more successfully carried out.

A suitable example of the leveler may be a roller that can level the forming material by way of contact with the surface of the forming material. The leveler moves together with the discharge head during the first direction scan to level the forming material discharged in the first direction scan to be uniform in height.

[Configuration 4]

The first direction scan driver may drive the discharge head to perform preset N number of the first direction scans (N is an integer greater than or equal to 2) at the same position based on one of the pieces of the slice data. The leveler, in M number of the first direction scans (M is an integer greater than or equal to 2 and less than or equal to N) among the N number of the first direction scans, may level the forming material discharged in the M number of the first direction scans. The material-accumulating direction driver may change the head-platform distance so as to increase by a preset distance for each one of the M number of the first direction scans performed.

Of the N number of the first direction scans performed at the same position based on one piece of slice data, the forming material is leveled in the M number of the first direction scans; i.e., two or more first direction scans. This may allow the fixating material to be favorably leveled with a higher accuracy. By changing the head-platform distance every time when the forming material is leveled, the forming material leveled in different ones of the first direction scans may differ in height. As a result, the fine projections and depressions may be more favorably formed.

The "M" in the M number of the first direction scans including the material leveling may be smaller than the "N" in the N number of the first direction scans performed at the same position based on one piece of slice data. In the event that, for example, forward and backward direction scans are performed in the first direction, the forming material may be leveled in one of the forward and backward direction scans alone. In this instance, the M may be equal to one-half of the N. In the event of the first direction scan in one direction alone included in the first direction or leveling the forming material in both of the to-and-fro first direction scans, the M may be equal to the N.

[Configuration 5]

The material-accumulating direction driver may change the head-platform distance by a distance calculated by dividing a contiguous cross-sectional interval by the M for each one of the M number of the first direction scans performed based on one of the pieces of the slice data. The contiguous cross-sectional interval is a term used to define a pitch in the material-accumulating direction between two adjacent cross-sectional shapes represented by two of the pieces of the slice data contiguous in the material-accumulating direction.

By thus changing the head-platform distance every time when the forming material is leveled in the first direction scan, the fine projections and depressions may be more favorably formed. In this instance, the forming material may be leveled at constant intervals. This may allow the three-dimensional object to have a surface improved in smoothness.

The contiguous cross-sectional interval may be a constant interval between any contiguous ones of the pieces of the slice data. The distance calculated by dividing the contiguous cross-sectional interval by the M may be a distance calculated by dividing the constant interval by the M. The contiguous cross-sectional interval may differ for each of the pieces of the slice data. The distance calculated by dividing the contiguous cross-sectional interval by the M may be a distance calculated by dividing, by the M, a contiguous cross-sectional interval between one of the pieces of the slice data for a portion currently formed and one of the pieces of the slice data for a portion to be subsequently formed. When the head-platform distance is changed by the distance calculated by dividing the contiguous cross-sectional interval by the M, the head-platform distance may be changed by a distance substantially equal to the distance calculated by dividing the contiguous cross-sectional interval by the M.

[Configuration 6]

The material-accumulating direction driver may change the head-platform distance for each one of the plurality of the first direction scans performed at the same position based on one of the pieces of the slice data so as to increase the head-platform distance by a substantially constant predetermined distance.

This may allow the scan to be performed by the same distance in the material-accumulating direction after any one of the first direction scans. As a result, the fine projections and depressions may be more favorably formed during the forming operation performed based on one piece of slice data.

[Configuration 7]

The material-accumulating direction driver may move at least one of the forming platform and the discharge head during the first direction scan so as to increase the head-platform distance. This may allow the head-platform distance to suitably change while performing the plural first direction scans at the same position based on one piece of slice data.

[Configuration 8]

During the first direction scan, the material-accumulating direction driver may successively change the head-platform distance so as to increase the head-platform distance by degrees. This may ensure steady and suitable changes of the head-platform distance during the first direction scan.

[Configuration 9]

A scan width, a distance by which the discharge head is moved in the first direction scan by the first direction scan driver, may be set in accordance with a width of the three-dimensional object to be formed. The material-accumulating direction driver may set a rate of change of the head-platform distance depending on the scan width so as to have the head-platform distance continue to change during the first direction scan.

By setting the scan width suitable for the width of the three-dimensional object to be formed, the first direction scans may be more efficiently performed. The rate of change of the head-platform distance may be set suitably for the scan width so as to have the head-platform distance continue to change during the first direction scan. As a result, the head-platform distance may be steadily and equally changed in the first direction scans. By thus setting the scan width suitable for the width of the three-dimensional object to be formed, the head-platform distance may be more favorably changed.

[Configuration 10]

At an interval between two consecutive ones of the first direction scans, the material-accumulating direction driver does not change the head-platform distance. This may eliminate the need to save time for changing the head-platform distance between two consecutive ones of the first direction scans, improving the efficiency of the forming operation.

[Configuration 11]

The forming material may be an ultraviolet curing ink, and the discharge head may be an inkjet head that discharges ink droplets by inkjet printing technique. As a result, the three-dimensional object may be more favorably formed.

[Configuration 12]

The forming material may include at least a coloring material for coloring a surface of the three-dimensional object, and the forming apparatus has at least a discharge head that discharges the coloring material. As a result, a colored three-dimensional object formed may be formed as desired.

Conventionally, the contour-like patterns, if generated in a surface-colored three-dimensional object, may more adversely affect the visual impression than a colorless three-dimensional object. The forming apparatus thus characterized may prevent that the contour-like patterns resulting from large stepped parts are formed, thereby suppressing the risk of undermining the visual impression of such a surface-colored three-dimensional object. Further, a colored three-dimensional object may be more favorably formed with a high accuracy.

[Configuration 13]

A forming method for a three-dimensional object is provided. The fainting method includes:

storing in a data storage slice data that represents a cross-sectional shape of a three-dimensional object to be formed;

using a discharge head that discharges a forming material and a forming platform disposed at a position so as to face the discharge head, the forming platform being a member in the form of a table that supports the three-dimensional object currently formed;

prompting the discharge head to perform a first direction scan in which the discharge head, while discharging the forming material, moves relative to the forming platform in a first direction previously set;

moving at least one of the forming platform and the discharge head in a material-accumulating direction to change a head-platform distance between the discharge head and the forming platform, the material-accumulating direction being a direction in which the forming material discharged from the discharge head is accumulated in layers;

storing in the data storage a plurality of pieces of the slice data that respectively represent cross-sectional shapes at different positions in the three-dimensional object in the material-accumulating direction;

prompting the discharge head to perform a plurality of the first direction scans at the same position in the three-dimensional object currently formed based on a respective one of the pieces of the slice data; and moving at least one of the forming platform and the discharge head so as to increase the head-platform distance at least at any one of timings during the plurality of the first direction scans performed at the same position based on one of the pieces of the slice data. This forming method may exert the same effect as the Configuration 1.

[Configuration 14]

A forming apparatus for forming a three-dimensional object is provided. The forming apparatus includes:

a discharge head that discharges a forming material;

a forming platform disposed at a position so as to face the discharge head, the forming platform being a member in the form of a table that supports the three-dimensional object currently formed;

a first direction scan drive that drives the discharge head to perform a first direction scan in which the discharge head, while discharging the forming material, moves relative to the forming platform in a first direction previously set; and a material-accumulating direction driver that moves at least one of the forming platform and the discharge head in a material-accumulating direction to change a head-platform distance between the discharge head and the faulting platform, the material-accumulating direction being a direction in which the forming material discharged from the discharge head is accumulated in layers.

The material-accumulating direction driver is configured to move at least one of the forming platform and the discharge head during the first direction scan so as to increase the head-platform distance.

The forming apparatus thus characterized may successfully increase the head-platform distance synchronously with the discharge of the forming material in the first direction scan. The forming apparatus may also adjust the head-platform distance to a suitable extent depending on the progress of the forming operation.

[Configuration 15]

A forming method for forming a three-dimensional object is provided. The forming method includes:

using a discharge head that discharges a forming material and a forming platform disposed at a position so as to face the discharge head, the forming platform being a member in the form of a table that supports the three-dimensional object currently formed;

prompting the discharge head to perform a first direction scan in which the discharge head, while discharging the forming material, moves relative to the forming platform in a first direction previously set;

moving at least one of the forming platform and the discharge head in a material-accumulating direction to change a head-platform distance between the discharge head and the forming platform, the material-accumulating direction being a direction in which the forming material discharged from the discharge head is accumulated in layers; and moving at least one of the forming platform and the discharge head during the first direction scan so as to increase the head-platform distance. This forming method may exert the same effect as the Configuration 14.

This disclosure may enable a high-quality three-dimensional object forming operation to be more favorably carried out.

BRIEF DESCRIPTION OF THE DRAWINGS

FIG. 1A is a block diagram illustrating main structural elements of the forming apparatus 10 and FIG. 1B is a drawing of a further detailed structure of a head unit 12;

FIG. 2A is an exemplified layer-based forming operation and FIG. 2B illustrates an unresolved issue associated with the conventional layer-based forming operation;

FIG. 4A is a chart of an exemplified forming operation according to the embodiment and FIG. 4B is a chart of a forming operation according to a modified example;

FIG. 5A is a cross-sectional view of the three-dimensional object 50 along a plane perpendicular to a main scanning direction (Y direction) and FIG. 5B is a cross-sectional view of the three-dimensional object 50 along a plane perpendicular to a material-accumulating direction (Z direction);

FIG. 6A is an exemplified mask used in 2D mask-used sequential pass technique and FIG. 6B is an exemplified formed surface of the three-dimensional object 50 currently formed; FIG. 7A illustrates an example of how to change the head-platform distance when main scans are performed, with the head-platform distance being fixed to a certain distance and FIG. 7B illustrates an example of how to change the head-platform distance when main scans are performed with the head-platform distance being changed.

DETAILED DESCRIPTION OF EMBODIMENTS

Figure 1A:
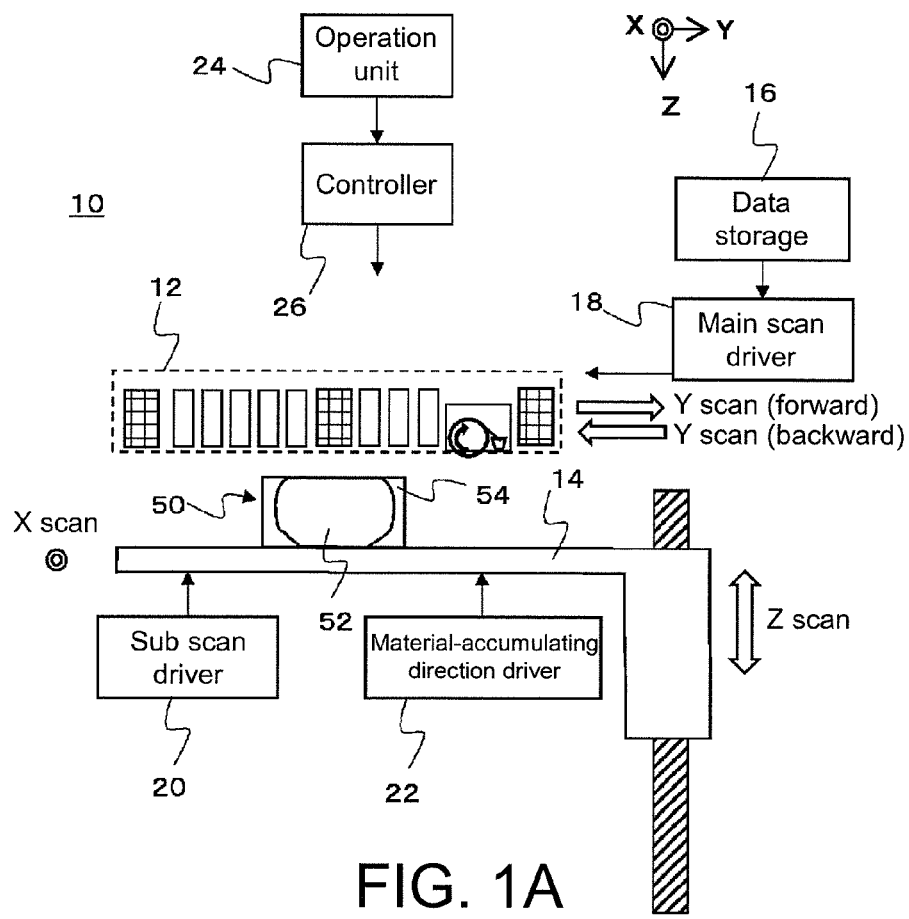
FIGS. 1A and 1B are drawings of a forming apparatus 10 according to an embodiment of this disclosure where
Figure 1B:
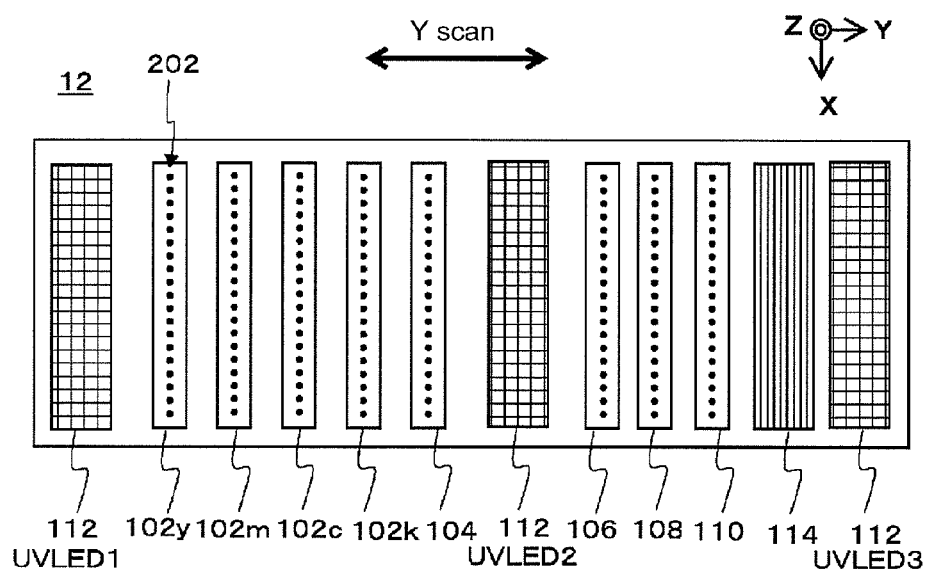

An embodiment of this disclosure is hereinafter described referring to the accompanying drawings. FIGS. 1A and 1B are drawings of a forming apparatus 10 according to an embodiment of this disclosure. FIG. 1A is a block diagram illustrating main structural elements of the forming apparatus 10. In the illustrated example, the forming apparatus 10 is configured to form a three-dimensional object (formed article) 50 using pieces of slice data representing cross-sectional shapes of the object 50. The three-dimensional object 50 is a three-dimensionally structured article.

Except for the descriptions hereinafter described, the forming apparatus 10 may be configured identically or similarly to the conventional forming apparatuses. The forming apparatus 10 may be a known inkjet printer partly modified. The forming apparatus 10 may be a partly modified inkjet printer using an ultraviolet curing ink (UV ink) for two-dimensional printing. In addition to the illustrated configurations, the forming apparatus 10 may be equipped with other configurations that may be required to form and color the three-dimensional object 50.

In this embodiment, the forming apparatus 10 may form the three-dimensional object 50 including a formed portion 52 and a support portion 54. The formed portion 52 is the body of the three-dimensional object 50 to be kept after the forming is completed. The support portion 54 refers to a part of the object 50 formed by support layers around the formed portion 52 to support the formed portion 52 currently formed. The support layers constitute a laminated structure surrounding the circumference of the formed portion 52 currently formed to support the formed portion 52. The support layers are dissolved with water and removed after the forming is completed.

The forming apparatus 10 in the illustrated example includes a head unit 12, a forming platform 14, a data storage 16, a main scan driver 18, a sub scan driver 20, a material-accumulating direction driver 22, an operation unit 24, and a controller 26. The head unit 12 discharges droplets (ink droplets) of a material (forming material) of the three-dimensional object 50. The ink droplets curable under certain conditions are discharged and cured to form different structural parts of the three-dimensional object 50.

The head unit 12 has a plurality of inkjet heads. In this embodiment, the ink used as the forming material may be an ultraviolet curing ink curable by being irradiated with ultraviolet light. The ink is a liquefied material discharged from the inkjet heads. The inkjet heads may be discharge heads from which the droplets are discharged by inkjet printing technique. Specific configurations of the head unit 12 will be described later in further detail.

The forming platform 14 is a member in the form of a table that supports the three-dimensional object 50 currently formed. The forming platform 14 is disposed at a position so as to face the inkjet heads of the head unit 12. The three-dimensional object 50 is formed on the upper surface of the forming platform 14. The forming platform 14 has at least an upper surface movable in a material-accumulating direction (Z direction in the drawing). The upper surface of the forming platform 14 is moved by the material-accumulating direction driver 22 in accordance with the progress of the three-dimensional object 50 currently formed. The forming apparatus 10 may appropriately change a head-platform distance, that is, distance between the inkjet heads of the head unit 12 and the forming platform 14.

In this embodiment, the material-accumulating direction refers to a direction in which the inks discharged from the inkjet heads of the head unit 12 are accumulated in layers. The direction in which the inks discharged from the inkjet heads are accumulated in layers may be, for example, a direction in which the inks discharged based on different pieces of the slice data are accumulated in layers. The material-accumulating direction is specifically a direction orthogonal to a main scanning direction (Y direction) and a sub scanning direction (X direction) described later. The material-accumulating direction may be a direction parallel to a direction in which the inks are discharged from the inkjet heads of the head unit 12.

The head-platform distance may be specifically a distance between surfaces of nozzles of the inkjet head and the upper surface of the forming platform 14. The upper surface of the three-dimensional object 50 refers to a presently uppermost surface (formed surface) of this object on which a next ink layer will be formed by the head unit 12.

The data storage 16 is a device which stores slice data. In this embodiment, the slice data represents a cross-sectional shape of the three-dimensional object 50 along a plane orthogonal to the material-accumulating direction. The cross-sectional shape of the three-dimensional object 50 along a plane orthogonal to the material-accumulating direction refers to a cross-sectional shape, along a plane orthogonal to the material-accumulating direction, of the three-dimensional object 50 set on the forming platform 14 as in the forming operation. The data storage 16 stores plural pieces of slice data respectively representing cross-sectional shapes at different positions in the object in the material-accumulating direction. The slice data may be data containing three-dimensional information of the three-dimensional object 50 that represents cross-sectional shapes at different positions in the material-accumulating direction.

The plural ones of slice data may represent the shapes of the cross-sectional surfaces at positions equally spaced in the material-accumulating direction. The slice data may be the same as or similar to slice data used by the known forming apparatuses. The respective pieces of slice data may be data that specifies positions in cross section of the three-dimensional object at which voxels should be formed. The voxel refers to a three-dimensional pixel formed by the ink droplets discharged from the inkjet heads. In this embodiment, a slice data-based operation conventionally performed is at least partly changed to form the three-dimensional object 50. The forming operation in this embodiment will be described later in further detail.

The main scan driver 18 drives the head unit 12 to perform main scans (Y scans). Driving the head unit 12 to perform main scans may exactly mean driving the inkjet heads of the head unit 12 to perform main scans. The main scan may refer to an operation in which the ink droplets are discharged from the inkjet heads moving in the main scanning direction previously set (Y direction in the drawing).

The main scan driver 18 may move a carriage holding the head unit 12 along a guide rail to prompt the head unit 12 to perform the main scans. The carriage may be a holder in which the inkjet heads of the head unit 12 are held so as to face the forming platform 14. The inkjet heads of the head unit 12 being held so as to face the forming platform 14 may be specifically the inkjet heads being held so that the ink droplets are discharged therefrom toward the forming platform 14. The guide rail is a rail-like member that guides the movement of the carriage. During the main scans, the guide rail is prompted by the controller 26 to move the carriage.

In this embodiment, the main scanning direction is an example of the first direction. The main scan driver 18 is an example of the first direction scan driver. The main scan is an example of the first direction scan. The movement of the head unit 12 during the main scans may be relative movement of the head unit 12 to the forming platform 14 supporting the three-dimensional object 50. In a modified embodiment of the forming apparatus 10, the forming platform 14 may be moved instead of the head unit 12 fixed at a position.

The sub scan driver 20 drives the head unit 12 to perform sub scans (X scans). Driving the head unit 12 to perform sub scans may exactly mean driving the inkjet heads of the head unit 12 to perform sub scans. The sub scan may refer to an operation in which the inkjet heads move relative to the forming platform 14 in the sub scanning direction (X direction in the drawing) orthogonal to the main scanning direction. The sub scan may be an operation in which the inkjet heads move at a preset rate of feed relative to the forming platform 14 in the sub scanning direction. The sub scan driver 20 drives the inkjet heads of the head unit 12 to perform the sub scans at intervals between the main scans.

Specifically, the sub scan driver 20 may drive the inkjet heads to perform the sub scans by moving the forming platform 14, with the head unit 12 being fixed at a position in the sub scanning direction. Alternatively, the sub scan driver 20 may drive the inkjet heads to perform the sub scans by moving the head unit 12, with the forming platform 14 being fixed at a position in the sub scanning direction.

In this embodiment, the sub scanning direction is an example of the second direction. The sub scan driver 20 is an example of the second direction scan driver. The sub scan is an example of the second direction scan.

The material-accumulating direction driver 22 drives at least one of the head unit 12 and the forming platform 14 to move in the material-accumulating direction (Z direction). Moving the head unit 12 in the material-accumulating direction may be specifically moving at least the inkjet heads of the head unit 12 in the material-accumulating direction. Moving the forming platform 14 in the material-accumulating direction may be specifically changing the position of at least the upper surface of the forming platform 14. The material-accumulating direction driver 22 moves at least one of the head unit 12 and the forming platform 14 in the material-accumulating direction to drive the inkjet heads to perform scans in the Z direction (Z scans), thereby changing the head-platform distance.

In the illustrated example, the material-accumulating direction driver 22 may move the forming platform 14, with the head unit 12 being fixed at a position in the material-accumulating direction. Alternatively, the material-accumulating direction driver 22 may move the head unit 12, with the forming platform 14 being fixed at a position in the material-accumulating direction.

The operation unit 24 is a device for inputting instructions to operate the forming apparatus 10. For example, the operation unit 24 receives various instructions from a user, including instructions to switch to and from different operation modes of the forming apparatus 10. The operation unit 24 may be a personal computer (PC) separately provided on the outside of the body of the forming apparatus 10.

The controller 26 may be a CPU of the forming apparatus 10. The controller 26 controls the structural elements of the forming apparatus 10 to control the operation to form the three-dimensional object 50. The controller 26 may preferably control the structural elements of the forming apparatus 10 based on pieces of information including shape-related information and color image information of the three-dimensional object 50 to be formed.

The forming apparatus 10 thus characterized discharges through the main scans the forming material on the upper surface of the three-dimensional object 50 currently formed (formed surface). Further, the forming apparatus 10, through the sub scans performed at intervals between the main scans, sequentially changes a region in which the forming material is discharged from the inkjet heads of the head unit 12. By repeatedly performing the main scans and the sub scans while performing scans in the material-accumulating direction, the forming apparatus 10 carries out the forming operation correspondingly to the respective pieces of slice data. By performing these scans correspondingly to different pieces of slice data, the three-dimensional object 50 is formed based on the respective pieces of slice data. As a result, the three-dimensional object 50 may be favorably formed. The slice data-based forming operation will be described later in further detail.

Specific configurations of the head unit 12 are hereinafter described. FIG. 1B is a drawing of a further detailed structure of the head unit 12. In this embodiment, the head unit 12 has a plurality of coloring heads 102*y*, 102*m*, 102*c*, 102*k* (hereinafter, collectively referred to as coloring heads 102*y-k*), a transparent ink head 104, a white ink head 106, a forming material head 108, a support material head 110, a plurality of ultraviolet light sources 112, and a leveling roller unit 114.

The coloring heads 102*y-k*, transparent ink head 104, white ink head 106, forming material head 108, and support material head 110 are inkjet heads from which the ink droplets are discharged by inkjet printing technique. In this embodiment, these inkjet heads discharge the droplets of ultraviolet curing inks. These inkjet heads are arranged next to one another in the main scanning direction (Y direction) in positional alignment with one another in the sub scanning direction (X direction).

These inkjet heads may be selected from suitable ones of the known inkjet heads. These inkjet heads have nozzle arrays 202 on their surfaces facing the forming platform 14. The nozzle arrays 202 each have a plurality of nozzles arranged in a row in the sub scanning direction. The ink droplets are discharged through the nozzles of the inkjet heads thus arranged toward the forming platform 14. The nozzle arrays each having a row of nozzles are extending in a direction orthogonal to the main scanning direction. In a modified embodiment of the inkjet heads, the main scanning direction and the nozzle array-extending direction may intersect each other at any angle but the right angle. The described arrangement of the inkjet heads is a non-limiting example, which may be optionally changed. For example, some of the inkjet heads may be displaced from the other inkjet heads in the sub scanning direction. In this embodiment, the inks used in the inkjet heads of the head unit 12 are examples of the forming material.

The coloring heads 102y-k respectively discharge the droplets of inks in different colors. The coloring inks may be inks discharged to color the surface of the three-dimensional object. In this embodiment, the coloring heads 102y-k respectively discharge the droplets of ultraviolet curing inks in Y (yellow), M (magenta), C (cyan), and K (black) colors. In a modified embodiment of the head unit 12, the head unit 12, in addition to the coloring heads 102y-k, may have other inkjet heads that discharge inks in pale colors of the before-mentioned colors and/or R (red), G (green), B (blue), and/or orange color inks.

The transparent ink head 104 discharges the droplets of a transparent ink. The transparent ink is a clear ink. The white ink head 106 discharges the droplets of a white color (W) ink.

The forming material head 108 discharges the droplets of an ink for forming the interior structure of the three-dimensional object 50. For example, the forming material head 108 discharges an ink for forming a region of the three-dimensional object 50 to be left uncolored. The interior structure of the three-dimensional object 50 may be specifically the interior structure of the formed portion 52 constituting the three-dimensional object 50. In this embodiment, the forming material head 108 discharges the droplets of a forming ink (modeling material MO) having a predefined color. The forming ink may be a special ink for exclusive use in forming. In this embodiment, the forming ink has a color different from the colors of the CMYK inks. Possible examples of the forming ink may be a white ink and a transparent ink (clear ink).

The support material head 110 discharges ink droplets containing a material for support layers constituting the support portion 54 of the three-dimensional object 50. In this embodiment, preferable examples of the material for support layers may include water-soluble materials that can be dissolved with water after the three-dimensional object 50 is formed. This material to be removed after the forming finishes may preferably be selected from materials more easily dissolvable and having a lower degree of cure by ultraviolet light than the material for the formed portion 52 of the three-dimensional object 50. The material for the support layers may be any suitable one of the support layer materials conventionally used.

The ultraviolet light sources 112 are employed as an exemplified curing means. These light sources emit ultraviolet light to cure the ultraviolet curing inks. A suitable example of the ultraviolet light source 112 may be ultraviolet LED (UVLED). Other examples of the ultraviolet light source 112 may be a metal halide lamp and a mercury lamp.

In this embodiment, the ultraviolet light sources 112 are respectively disposed at positions on one end side and the other end side in the main scanning direction and at an intermediate position between the inkjet heads of the head unit 12 in the inkjet head-arranging direction. The inkjet heads of the head unit 12 are thus interposed between the ultraviolet light sources 112 in the main scanning direction. During the main scans, the inks discharged from the inkjet heads may be then cured by the ultraviolet light sources 112 on the rear side of the inkjet heads that have just discharged the inks. Then, the inks used as the forming material may be accordingly adequately cured.

Preferably, at least one of the ultraviolet light sources 112 is disposed between a group of the coloring heads 102y-k and the forming material head 108 and driven correspondingly to an operation mode (for example, to be colored or uncolored) of the forming apparatus 10. When the ultraviolet-curable (or photo-curable) support material is used as in this embodiment, the support material head 110 may preferably be interposed between the ultraviolet light sources 112 (for example, the ultraviolet light sources 112 indicated by UVLEDs 2 and 3 in the drawing).

The forming apparatus, if starting with the forming operation alone without having to use the coloring heads 102y-k, may form the three-dimensional object 50 by solely using the forming material head 108 and the ultraviolet light sources 112 indicated by UVLEDs 2 and 3 in the drawing. If necessary, the white ink head 106 may be additionally used to whiten the surface of the three-dimensional object 50. In that case, the white ink may serve as backing print when the three-dimensional object 50 is later colored by subtractive color mixture of the YMCK process colors. In the event of forming an overhang-shaped object, the forming apparatus additionally prompts the support material head 110 to discharge the support material.

In the event of forming and coloring a three-dimensional object simultaneously, the forming apparatus may form the object while coloring the object by using all of the inkjet heads of the head unit 12 and all three UVLEDs. Possible options for the other operation modes may include the following modes: a third mode in which a three-dimensional object is formed by the white ink head 106, UVLED 2, and UVLED 3; a fourth mode in which a three-dimensional object is formed by the transparent ink head 104, UVLED 1, and UVLED 2; and a fifth mode in which a three-dimensional object is formed by the transparent ink head 104, UVLED 1, and UVLED 2 and optionally colored by the coloring heads 102y-k.

The leveling roller unit 114 may level the inks discharged from the inkjet heads of the head unit 12 during the operation to form the three-dimensional object 50. In this embodiment, the leveling roller unit 114 is interposed between the inkjet heads of the head unit 12 and the ultraviolet light source 112 on the right end side on the drawing. The leveling roller unit 114 is disposed next to the inkjet heads in the main scanning direction in positional alignment with the inkjet heads in the sub scanning direction.

In this embodiment, the leveling roller unit 114 is an example of the leveler that levels the inks discharged from the inkjet heads during the main scans. The leveling roller unit 114 may contact and thereby level the inks discharged in a currently performed one of the main scans. The leveling roller unit 114 may thus level and thereby level out the inks to a preset height. In this embodiment, the leveling roller unit 114 may move together with the inkjet heads of the head unit 12 during at least a part of the main scans to level the inks discharged in a currently performed one of the main scans to be uniform in height.

In the illustrated example, the leveling roller unit 114 may have a leveling roller, a blade, and an ink collector. Among the structural parts of the leveling roller unit 114, the leveling roller actually levels the inks. The leveling roller may level the inks by removing a part of the uncured inks. The lower end of the leveling roller is located undermost among the structural parts of the head unit 12. The leveling roller rotates clockwise on the drawing during the leveling process. The blade scrapes the removed inks attached to the leveling roller off the leveling roller. The ink collector collects the inks scraped off the leveling roller by the blade.

In this embodiment, the leveling roller unit 114 is disposed on one side of the arranged inkjet heads in the main scanning direction, as illustrated in FIG. 1B. In this instance, the main scan driver 18 prompts the head unit 12 to at least perform the main scans in a direction in which the leveling roller unit 114 is behind the arranged inkjet heads (one direction included in the main scanning direction). The leveling roller unit 114 levels the inks during the main scans performed in this direction.

The main scan driver 18 may prompt the head unit 12 to bidirectionally perform the main scans. In this instance, the main scan driver 18, in addition to the main scans performed in the direction in which the leveling roller unit 114 is behind the arranged inkjet heads, prompts the head unit 12 to perform the main scans in the other direction in which the leveling roller unit 114 is ahead of the arranged inkjet heads (the other direction included in the main scanning direction). During the main scan in the other direction, the material-accumulating direction driver 22 increases the head-platform distance to be greater than during the main scans unidirectionally performed so as to prevent any contact of the leveling roller unit 114 with the ink layers. Of the main scans performed in one of the one and other directions, the leveling roller unit 114 levels the inks during the main scans performed in one of the directions alone. The leveling process by the leveling roller unit 114 will be described later in further detail in connection with the forming operation based on different pieces of slice data.

Figure 2A:
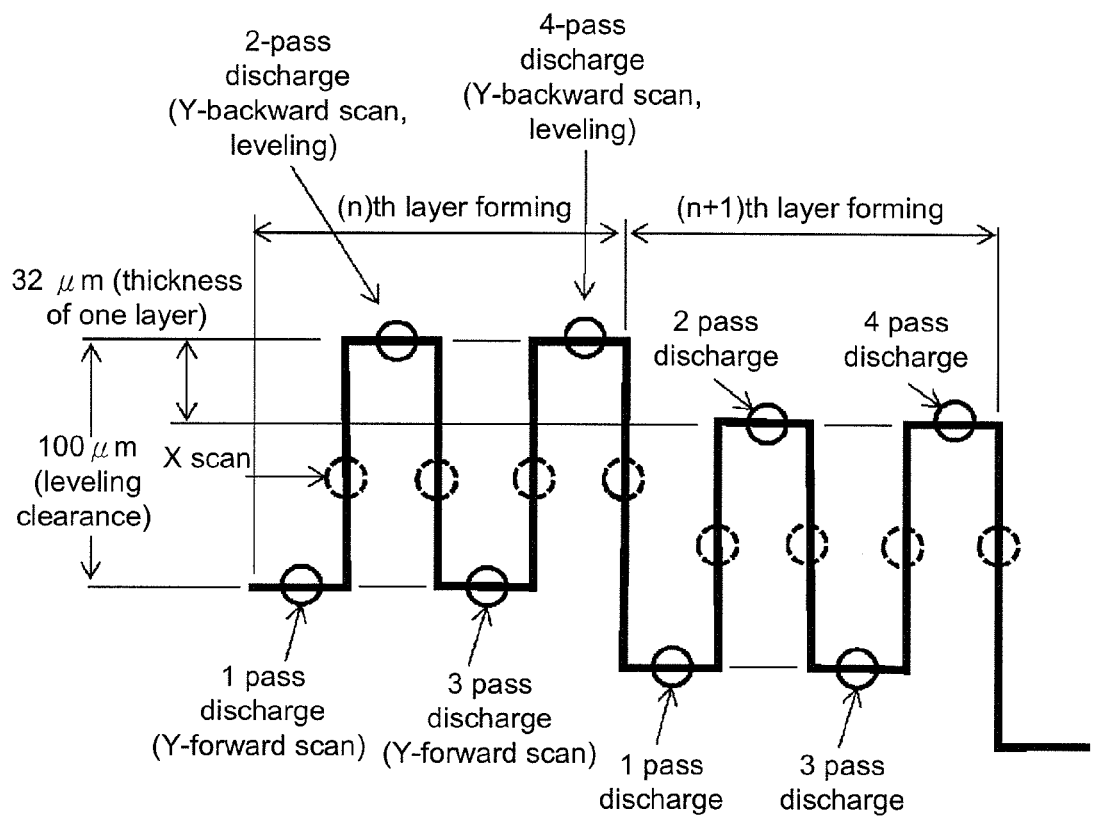
FIGS. 2A and 2B are drawings illustrating an exemplified forming operation conventionally performed where
Figure 2B:
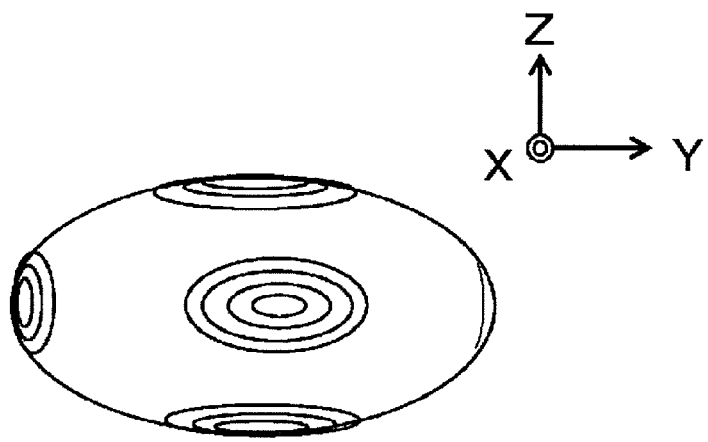
Figure 3:
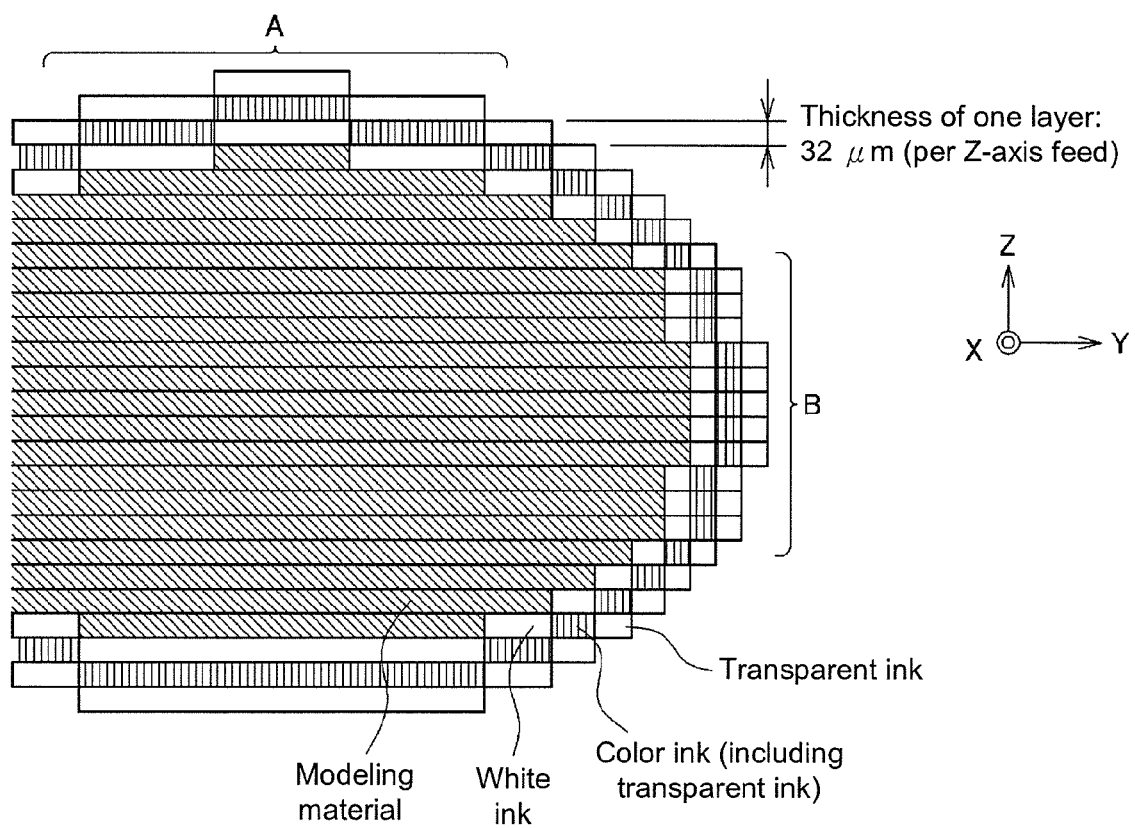
FIG. 3 is a cross-sectional view of a three-dimensional object formed by the conventional layer-based forming operation.

The forming operation in this embodiment is described below in further detail. First, a forming operation of the known art is described for descriptive purposes. FIGS. 2A to 3 are drawings that illustrate the forming operation of the known art. FIGS. 2A and 2B illustrate an exemplified forming operation conventionally performed.

The known art has likewise used different pieces of slice data to form three-dimensional objects. The ink layers each corresponding to one piece of slice data are formed and stacked on one another to form a three-dimensional object. Thus, the three-dimensional object forming operation of the known art may be a layer-based forming operation in which one ink layer is formed based on one piece of slice data.

FIG. 2A is a drawing of an exemplified layer-based forming operation, in which a time axis that advances from left to right is illustrated in the lateral direction, while the material-accumulating direction (Z direction) is illustrated in the vertical direction. This drawing illustrates an exemplified operation in which an (n)th ink layer and an (n+1)th ink layer are formed when the head unit 12 bidirectionally performs the main scans, and the main scans in one direction alone are combined with the leveling process. The (n)th ink layer (n is an integer greater than or equal to 1) and the (n+1)th ink layer refer to the (n)th ink layer and the (n+1)th ink layer from the bottom of all of the ink layers accumulated on the forming platform. Each one of the ink layers is formed based on one piece of slice data.

In the illustrated example, a forward main scan (Y-forward scan) and a backward scan (Y-backward scan) are respectively performed twice; four main scans in total, at each of positions in the three-dimensional object based on one piece of slice data. In this instance, the leveling process is performed in the backward main scans alone, while being omitted in the forward main scans.

During the forward main scans, therefore, the forming platform is lowered to increase the head-platform distance to avoid any contact of the leveling roller of the leveling roller unit with the ink layers. For example, the head-platform distance may be increased by approximately 100 μm during the forward main scans as compared to the backward main scans combined with the leveling process, which is illustrated as leveling clearance in the drawing.

During the backward main scans, on the other hand, the head-platform distance is set to a distance small enough for the leveling roller of the leveling roller unit to contact the ink layers, so that the ink layers are leveled during the backward main scans.

As is known from the drawing, the head-platform distance may be equally set in both of the plural (two) forward main scans performed based on one piece of slice data. Further, the head-platform distance is equally set in both of the plural (two) backward main scans performed based on one piece of slice data. This may uniform the height at which leveling is performed in the main scans performed based on the same piece of slice data. Thus, the layer-based forming operation may be suitably performed.

Further, the head-platform distance is increased by a dimension equal to the thickness of one ink layer upon completion of the plural main scans for one piece of slice data. In the illustrated example, the forming platform may be moved downward to increase the head-platform distance by 32 μm equal to the thickness of one ink layer every time when one ink layer is formed.

Referring to FIG. 2A, the head-platform distance, including the leveling clearance, is changed at a point in time after the (n)th ink layer is formed ((n)th ink layer forming) and before the (n+1)th ink layer starts to be formed ((n+1)th ink layer forming). Also in this instance, as is clearly known from the backward main scans involving the leveling process, the head-platform distance may be set to differ by a dimension equal to the thickness of one ink layer between the (n)th ink layer forming and the (n+1)th ink layer forming.

By thus forming the ink layers corresponding to the respective pieces of slice data, the ink layers may be plurally formed on one another. Thus, the known art may apparently succeed in forming a three-dimensional object. The known art, however, may entail some issues attributed to the configuration per se, that is, forming the laminated structure of ink layers to form a three-dimensional object.

FIG. 2B illustrates an unresolved issue associated with the conventional layer-based forming operation. As described earlier, the conventional layer-based forming operation may need to change the head-platform distance by a dimension equal to the thickness of one ink layer every time when one ink layer is formed.

Three-dimensional objects, to be formed in certain shapes, may be formed of ink layers that differ in size. In such a case, stepped parts each equal in height to the thickness of one ink layer may be formed in overlapping ones of the ink layers formed in different regions of the object.

Taking an egg-shaped three-dimensional object for instance, as illustrated in FIG. 2B, such stepped parts may result in disturbing patterns of concentric circles, like contour lines, in the three-dimensional object finally obtained. These patterns may respectively appear in the main scanning direction (Y direction), sub scanning direction (X direction), and material-accumulating direction (Z direction). Such patterns may inevitably degrade the quality of the three-dimensional object. This adverse impact from the stepped parts may be particularly noticeable in surface-colored three-dimensional objects.

FIG. 3 is a cross-sectional view of a three-dimensional object formed by the conventional layer-based forming technique. This three-dimensional object has a surface colored with coloring inks (color inks). After the formation of the interior structure of the three-dimensional object, that is, formed portion, using a modeling material which is an example of the forming ink, the circumference of the formed portion is then colored, as illustrated in the drawing. For an adequate coloring effect, a white ink region, a color ink region, and a transparent ink region are formed on the circumference of the modeling material-formed portion in the mentioned order toward the outer side. In this instance, the transparent ink, in addition to the coloring inks in different colors, may preferably be used to form the color ink region.

By thus forming the color ink region on the outer side of the white ink region functioning as a reflective layer, various colors may be vibrantly reproduced. Further, ink consumption per unit volume may be regulated to be constant by using the transparent ink in addition to the different coloring inks to form the color ink region. By further forming the transparent ink region on the outer side, the surface of the formed portion may be protected well.

In the three-dimensional object thus formed, the stepped parts each equal in height to the thickness of one ink layer are formed on the surface of the formed portion, as described referring to FIG. 2B. Referring to the example illustrated in FIG. 2A in which one ink layer has the thickness of 32 μm, a stepped part of 32 μm in height is generated, as illustrated in FIG. 3. As a result, the contour-like patterns may stand out on the surface of the formed portion (at positions in regions illustrated with A and B where the pitch of a stepped part is large enough to be visually recognizable).

These stepped parts may adversely affect the visual impression of a three-dimensional object finally obtained, degrading the quality of the three-dimensional object. Especially, in the event of a three-dimensional object colored on its surface (surface of the formed portion), the contour-like patterns, if generated, may more adversely affect the visual impression than colorless three-dimensional objects. Such patterns may inevitably degrade the quality of the formed three-dimensional object.

In contrast to the known art, the embodiment of this disclosure suggests a main scan-based (pass-based) forming operation, instead of the layer-based forming operation to suppress the risk of the conventional issues. The forming operation in this embodiment is described below in further detail.

Figure 4A:
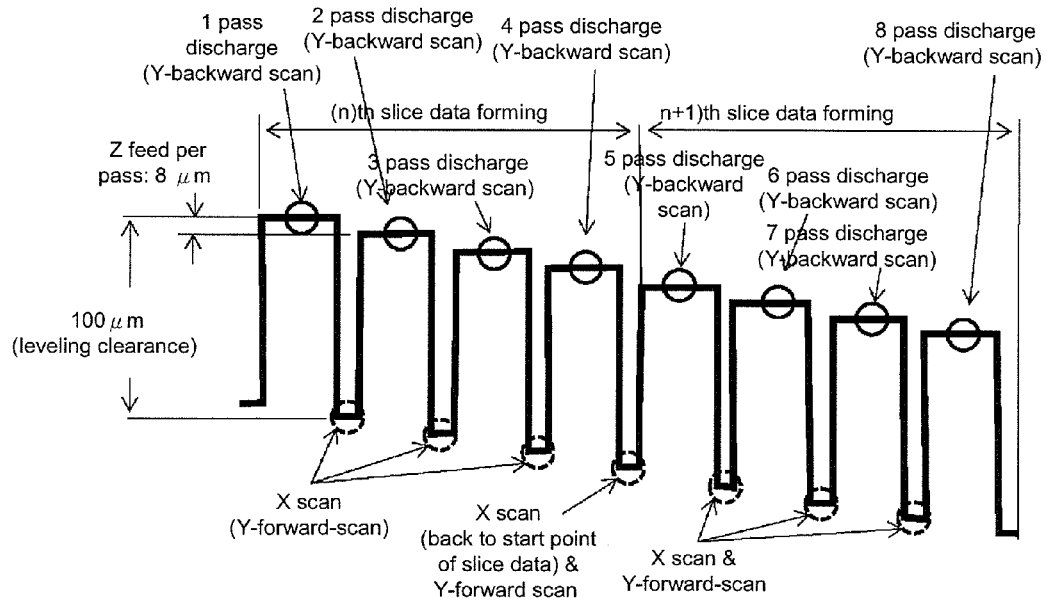
FIGS. 4A and 4B are drawings illustrating a forming operation carried out by the forming apparatus 10 where
Figure 4B:
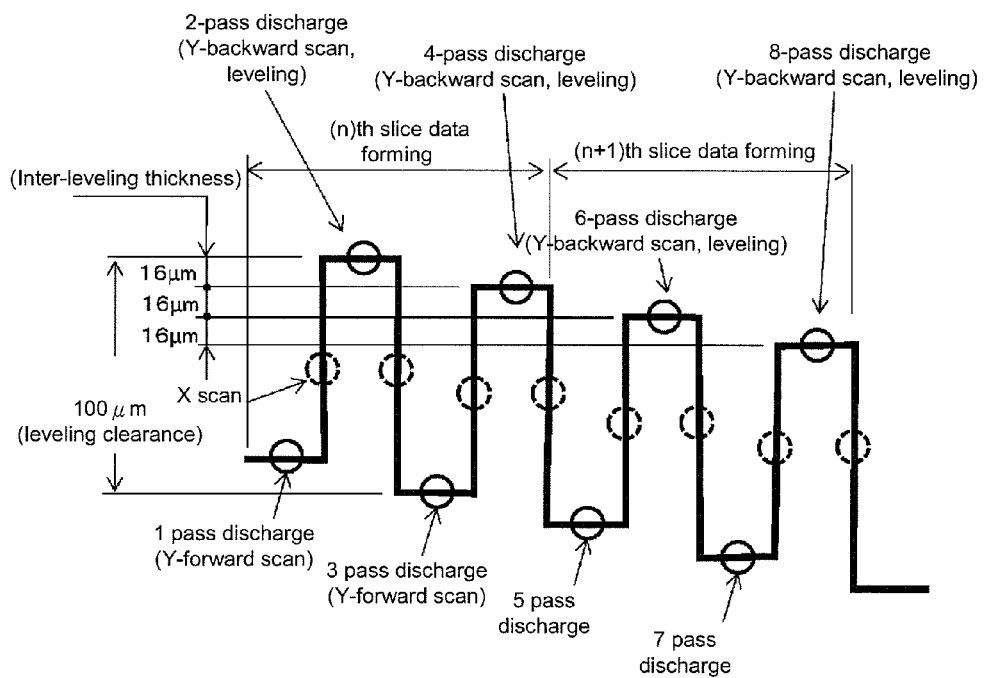

FIGS. 4A and 4B illustrate a forming operation carried out by the forming apparatus 10 described with reference to FIG. 1A. FIG. 4A is a drawing of an exemplified forming operation according to this embodiment, illustrating the slice data-based main scans and the leveling process when the main scans are unidirectionally performed (unidirectional Y scans).

An (n)th slice data forming illustrated in the drawing refers to a forming operation performed based on an (n)th piece of slice data from the bottom. An (n+1)th slice data forming illustrated in the drawing refers to a forming operation performed based on an (n+1)th piece of slice data from the bottom. The forming apparatus 10 performs four main scans (four passes) at each of positions on the formed surface of the three-dimensional object based on one piece of slice data. The four main scans performed based on one piece of slice data accumulate the inks in an amount corresponding to the thickness of 32 μm on the formed surface of the three-dimensional object. Specifically, the inks are discharged in an amount corresponding to the thickness of 40 μm, which are partly removed by the leveling process to adjust the thickness of the leveled inks to 32 μm. Discharging the inks in an amount corresponding to the thickness of 40 μm may be discharging the inks in an amount corresponding to the thickness of 40 μm when the four main scans finish without the leveling process. For illustrative purposes, the drawing shows the first main scan in the (n)th slice data forming as a 1st pass (1-pass discharge), and the main scans thereafter as 2nd to 8th passes (2nd-pass discharge to 8th-pass discharge), respectively.

Specifically, the head unit 12 (see FIGS. 1A and 1B), while being reciprocated in the main scanning direction, performs the main scans in which the ink droplets are discharged only when the head unit 12 is moving in the backward direction (Y-backward scan). The head unit 12, while moving in the forward direction (Y-forward scan), is prompted to move without discharging the ink droplets. When the head unit 12 is moving in the forward direction, the head-platform distance is temporarily increased, as illustrated as the leveling clearance in the drawing, in order to avoid any unnecessary contact of the head unit 12 with the three-dimensional object. At the time, the head-platform distance may preferably be increased by, for example, approximately 100 μm or more, as compared to the preceding main scan.

The feeding operation is performed in the material-accumulating direction (Z direction) to increase the head-platform distance by degrees in accordance with the progress of the forming operation. This feeding operation, however, is performed, not by each layer as in the known art, but for each one of the main scans (passes) plurally performed based on one piece of slice data. As illustrated in the drawing, when the feeding operation in the material-accumulating direction has a constant rate of feed (at equal intervals), the head-platform distance is increased by (32/4) =8 μm every time when each of the main scans is performed. When the thickness of the inks accumulated in the main scans plurally performed based on one piece of slice data is divided by the number of the performed main scans, the variation of the head-platform distance is calculated. In this instance, the thickness of the inks accumulated in the main scans plurally performed is the thickness of the leveled inks.

The material-accumulating direction driver 22 (see FIG. 1A) may change the head-platform distance for each one of the plural main scans performed at the same position based on one piece of slice data, so that the head-platform distance increases by a constant predetermined distance. The constant predetermined distance may be a substantially equal distance. The substantially equal distance may be an equal distance in design. The substantially equal distance may include distances more or less changed for fine tuning and/or operational optimization. The substantially equal distance may include errors within 10%.

The ink thickness, 32 μm, corresponding to one piece of slice data may be a distance corresponding to an interval between plural pieces of slice data used for forming the object. The interval between pieces of slice data may be a pitch in the material-accumulating direction between two adjacent cross-sectional shapes (contiguous cross-sectional interval) represented by two pieces of slice data that are contiguous in the material-accumulating direction.

Referring to the example illustrated in FIG. 4A, while the head unit 12 is moving backward, the leveling process by the leveling roller unit 114 (see FIGS. 1A and 1B) is performed synchronously with the main scan. In each of the main scans, therefore, the inks discharged then are leveled.

This may accurately uniform the height of the inks discharged in each of the main scans. As a result, a high-quality forming operation may be more successfully carried out. By performing the feeding operation in the material-accumulating direction in a manner different from the conventional layer-based forming operation, a three-dimensional object finally formed may have a different surface condition. The state of the three-dimensional object formed in this embodiment will be described later in further detail.

Generalizing the forming operation carried out by the forming apparatus 10 according to this embodiment, all of the main scans may not necessarily be combined with the leveling process. In that sense, the leveling roller unit 114 may level the inks discharged in at least a part of the plural main scans performed at the same position based on one piece of slice data. Leveling the inks discharged in the main scan may be leveling the inks discharged after the last leveling process in the main scans including the main scan currently performed. More specifically describing the main scans and the leveling process thus performed, a preset N number (N is an integer greater than or equal to 2) of main scans may be performed by the main scan driver 18 (see FIG. 1A) at the same position based on one piece of slice data, while the leveling roller unit 114 may level the inks discharged in M number (M is an integer greater than or equal to 2 and less than or equal to N) of main scans among the N number of main scans.

When the inks are leveled in a part of the main scans, the rate of feed to be set in the feeding operation in the material-accumulating direction may preferably be decided depending on how many of the main scans include the leveling process. When the inks are leveled in the M number of main scans alone among the N number of main scans for one piece of slice data, the material-accumulating direction driver 22 may change the head-platform distance in each one of the M number of main scans so as to increase the head-platform distance by a preset distance. Specifically, the material-accumulating direction driver 22 may change the head-platform distance, for each one of the M number of main scans performed based on one piece of slice data, by a distance calculated by dividing the contiguous cross-sectional interval by the M.

When the inks are leveled in a part of the main scans, the M number of main scans combined with the leveling process are fewer than the N number of main scans performed at the same position based on one piece of slice data. When the main scan is performed forward and backward in the main scanning direction, for example, the inks may be leveled in one of the forward and backward directions. In that case, the M may be a number of one-half of the N. When the main scan is unidirectionally performed as illustrated in the example of FIG. 4A, or an additional leveling roller unit 114 is interposed between the UVLED 1 and the coloring head 102y in FIG. 1B so as to reversely rotate, the M may be equal to the N.

The contiguous cross-sectional interval may be equal between any contiguous ones of the pieces of slice data. The distance calculated by dividing the contiguous cross-sectional interval by the M may be a distance calculated by dividing the equal interval by the M. Alternatively, the contiguous cross-sectional interval may differ for different pieces of the slice data. The distance calculated by dividing the contiguous cross-sectional interval by the M may be a distance calculated by dividing, by the M, a contiguous cross-sectional interval between one of the pieces of the slice data for a portion currently formed and one of the pieces of the slice data for a portion to be subsequently formed. Changing the head-platform distance by the distance calculated by dividing the contiguous cross-sectional interval by the M may be changing the head-platform distance by a distance substantially equal to the distance calculated by dividing the contiguous cross-sectional interval by the M.

FIG. 4B is a drawing of a modified forming operation, illustrating the slice data-based main scans and the leveling process when the leveling process is performed in a part of the main scans. Except for the descriptions hereinafter described, the operation illustrated in FIG. 4B is identical or similar to the operation illustrated in FIG. 4A.

The operation illustrated in FIG. 4B performs the forward and backward main scans in the main scanning direction (bidirectional Y scans) and performs the leveling process in the backward main scans alone. Specifically, four main scans (four passes) are performed at each of positions on the formed surface of the three-dimensional object based on one piece of slice data, and the leveling process is performed in the 2nd and 4th main scans performed at the each position. In the example illustrated in FIG. 4B, the 2nd and 4th main scans at the each position may refer to 2nd and 4th passes in the (n)th slice data forming, and 6th and 8th passes in the (n+1)th slice data forming.

Similarly to the example illustrated in FIG. 4A, the inks are discharged in an amount corresponding to the thickness of 40 μm in four main scans based on one piece of slice data, and the discharged inks are partly removed to adjust the post-leveling thickness to 32 μm. Since the leveling process is performed in the backward main scans alone, the head-platform distance is increased by 16 μm to level the inks every time when the main scans are performed twice. In the example illustrated in FIG. 4B, therefore, the ink height in the 1st and 2nd passes and the ink height in the 5th and 6th passes may be equally 32 μm, and the ink height in the 3rd and 4th passes and the ink height in the 7th and 8th passes may be equally 16 μm.

This may accurately uniform the height of the inks discharged in each of the main scans combined with the leveling process. As a result, a high-quality forming operation may be more successfully carried out. By performing the feeding operation in the material-accumulating direction in a manner different from the conventional layer-based forming operation, a three-dimensional object finally formed may have a surface condition different from the conventional one.

FIGS. 4A and 4B are simplified illustrations of the main scans and the leveling process performed at a particular position of interest in the three-dimensional object currently formed. The main scans and the leveling process at a particular position of interest in the three-dimensional object thus illustrated may be the main scans and the leveling process performed at a fixed position in the main and sub scanning directions. The main scan performed at a position may refer to a main scan in which the nozzle arrays of the inkjet heads pass over the position.

As illustrated as X scans in the drawing, the sub scans may be performed at intervals between the main scans. Depending on the manner of forming the three-dimensional object at different positions, the main scans for other regions may be further performed at intervals between the main scans illustrated in the drawing.

In addition to the examples illustrated in FIGS. 4A and 4B, a further modified example may be suggested for the forming operation by the forming apparatus 10. For example, the main scans performed based on one piece of slice data may not necessarily be four main scans but may be a different number of main scans.

In the further modified example of the forming apparatus 10, the head-platform distance may be increased subsequent to any main scan not involving the leveling process by the same distance as the leveling-involved main scan. In this instance, the head-platform distance may be changed for each main scan by a distance calculated by dividing the contiguous cross-sectional interval by the N. Further, providing the leveling clearance may not be required of any main scans in which the leveling process is omitted.

Further generalizing the forming operation carried out by the forming apparatus 10, the feeding operation (Z scans) in the material-accumulating direction may be performed between at least two consecutive ones of the plural main scans (passes) performed based on one piece of slice data. The main scan driver 18, based on respective pieces of slice data, may drive the inkjet heads to perform the plural main scans at the same position in the three-dimensional object currently formed. The material-accumulating direction driver 22 may change the head-platform distance in at least two of the plural main scans performed at the same position based on one piece of slice data, so that the head-platform distance in one of the main scans performed later than the other is greater by a preset distance than the head-platform distance in the other preceding one of the main scans.

These two main scans may be leveling-involved main scans. The material-accumulating direction driver 22 may preferably change the head-platform distance, so that the head-platform distance increases by a preset distance after at least two or more of the plural main scans performed at the same position based on one piece of slice data. When the leveling process is performed in the unidirectional main scans alone, these two main scans may be unidirectional main scans.

Figure 5A:
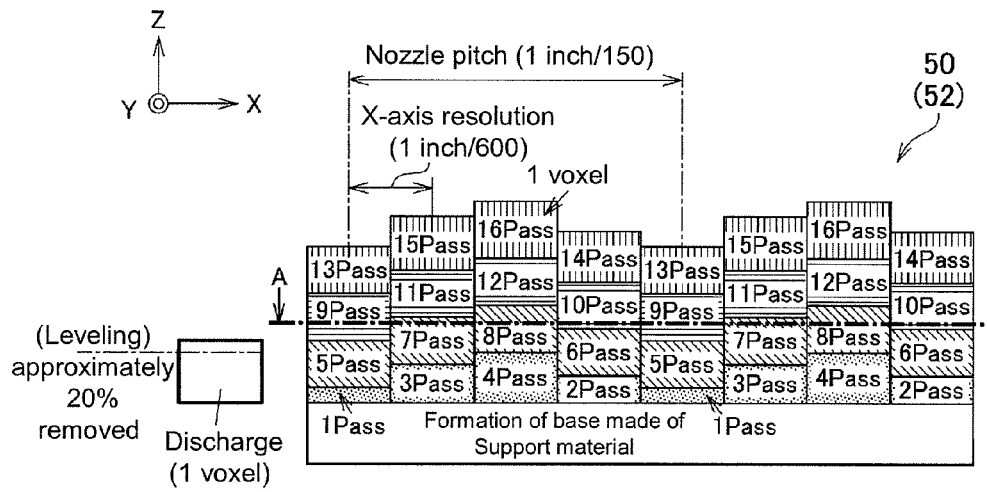
FIGS. 5A and 5B are cross-sectional views of a three-dimensional object 50 currently formed where
Figure 5B:
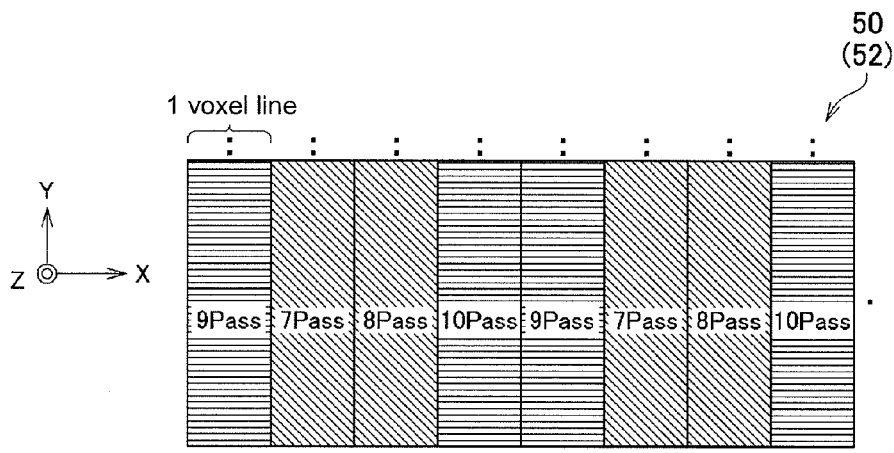

The state of the three-dimensional object 50 in this embodiment is hereinafter described in further detail. FIGS. 5A to 6B illustrate exemplified states of the three-dimensional object 50 formed in this embodiment. FIGS. 5A and 5B are cross-sectional views of an exemplified state of the three-dimensional object 50 currently formed. In the illustrated example, the cross section of the three-dimensional object 50 is the cross section of the formed portion 52 of the three-dimensional object 50. A base made of the support material is formed underneath the formed portion 52 of the three-dimensional object 50.

FIG. 5A is a cross-sectional view of the three-dimensional object 50 along a plane perpendicular to a main scanning direction (Y direction). In the illustrated example, the three-dimensional object is formed based on plural pieces of slice data, as described earlier. The plural main scans are performed at the same position based on one piece of slice data. In each one of the main scans, a part of voxels specified by the piece of slice data is formed. The voxel specified by the piece of slide data may refer to a voxel, a formation position of which is specified by the piece of slice data. The voxels are formed at different positions in each one of the plural main scans for one piece of slice data.

When performing the main scans as described referring to FIG. 4A, for example, the voxels formed in the main scans, which are indicated by 1-pass discharge to 8-pass discharge in FIG. 4A, are arranged like voxels indicated by 1 pass to 8 pass in FIG. 5A. The voxels formed in the main scans thereafter performed are arranged like voxels indicated by 9 pass to 16 pass.

In FIG. 5A, the nozzle pitch in the nozzle array of each inkjet head in the head unit 12 (see FIGS. 1A and 1B) is $1/150$ inch, and the forming resolution in the sub scanning direction is $1/600$ inch. The amount of inks removed by the leveling process by the leveling roller unit 114 (see FIG. 1B) is 20%.

Any voxels formed based on the same piece of slice data are illustrated with the same hatched lines.

In this embodiment, the head-platform distance is changed every time when the leveling process is performed in the main scan, as described referring to FIG. 4A. Additionally, the head-platform distance is changed at a point in time during the forming operation for one piece of slice data. In contrast to the conventional layer-based forming methods, a portion formed based on one piece of slice data may accordingly have fine projections and depressions lower in height than the stepped parts formed in the known art. Unlike the stepped parts simply and continuously formed by the ink layers as in the known art, the projections and depressions formed may be finer and discontinuous that may differ in height between the voxels formed based on the same piece of slice data in accordance with leveling positions in the respective main scans (passes), as illustrated in FIG. 5A. Such fine projections and depressions may be much less noticeable than the stepped parts formed in the known art, barely affecting the visual impression of the formed three-dimensional object 50.

This embodiment, by forming a three-dimensional object through such an effective approach different from the known art that performs a per-ink layer scan in the material-accumulating direction, may avoid the periodic contour-like patterns conventionally generated correspondingly to the ink layer thicknesses. This embodiment may further avoid the risk of forming such large stepped parts as in the known art, allowing the surface of the three-dimensional object 50 to improve in smoothness. These improvements combined may serve to prevent the surface-colored three-dimensional object 50 from presenting a poor visual impression. This embodiment, therefore, may successfully form the colored three-dimensional object 50 with a high accuracy. As a result, a high-quality forming operation may be more successfully carried out.

Focusing on the 9th to 12th passes in the illustrated example, the voxels formed in the main scans (passes) for one piece of slice data are arranged in the order of the 9th pass, 11th pass, 12th pass, and 10th pass in the sub scanning direction. This arrangement, however, is a non-limiting example. The voxels may be arranged differently. The voxels formed in these main scans may be arranged in the order of the 9th pass, 12th pass, 10th pass, and 11th pass. This may double the spatial frequency of the projections and depressions, possibly making the surface roughness less inconspicuous. On the other hand, the contour-like patterns may be even less noticeable.

In this embodiment, the ink droplets are discharged in plural main scans for one piece of slice data at the positions of voxels selected in a manner identical or similar to the known multi-pass technique. The positions of voxels may refer to their positions in the main and sub scanning directions. All of the voxels having their positions specified by one piece of slice data are formed in the main scans plurally performed. There are various options for setting of the voxels to be formed in the main scans.

For example, the voxels may be formed in the main scans plurally performed by sequential line technique. Forming the voxels by the sequential line technique may be specifically forming the voxels to be arranged in the main scanning direction at intervals suitable for the forming resolution using the nozzles of the inkjet heads in each of the main scans. Forming the voxels to be arranged in the main scanning direction at intervals suitable for the forming resolution may be forming the voxels using the nozzles so as to draw a straight line extending in the main scanning direction, as indicated by a 1-voxel line in the drawing. When the voxels are formed by the sequential line technique, the ink droplet discharge position in the sub scanning direction may be changed for each one of the main scans.

FIG. 5B is a cross-sectional view of the three-dimensional object along a plane perpendicular to the material-accumulating direction (Z direction). This is an A-A cross-sectional view of FIG. 5A when the voxels are formed by the sequential line technique. As illustrated in the drawing, straight lines formed in the main scans are aligned next to one another in the cross-sectional view.

On the uppermost surface of the three-dimensional object 50, straight lines that differ in height are aligned next to one another in the sub scanning direction. In the illustrated example, fine projections and depressions for the respective passes are formed in an area equivalent to four passes in the sub scanning direction as a result of four main scans performed based on one piece of slice data, and heights of these fine projections and depressions periodically change at the intervals of every four passes. The forming operation thus carried out may successfully prevent the occurrence of the conventional problem, that is, contour-like patterns that periodically appear correspondingly to the ink layer thicknesses.

As is clear from the illustrations of FIGS. 5A and 5B and the description given so far, the forming operation according to this embodiment may avoid the formation of stepped parts each formed correspondingly to an ink layer based on one piece of slice data, unlike the conventional method of forming one ink layer based on one piece of slice data. This may also avoid the occurrence of conspicuous patterns between parts of the formed three-dimensional object 50 where different pieces of slice data are used. The three-dimensional object 50 formed according to this embodiment, therefore, may be said to distinctly differ from any three-dimensional objects formed by the conventional method of forming one ink layer based on one piece of slice data.

There may be other options for setting the voxels to be formed in each of the main scans. For example, two-dimensional (2D) mask-used sequential pass technique may be one of the options. The 2D mask-used sequential pass technique may refer to a method of specifying the voxels to be formed in each of the main scans using a two-dimensional mask in the form of a matrix.

Figure 6A:
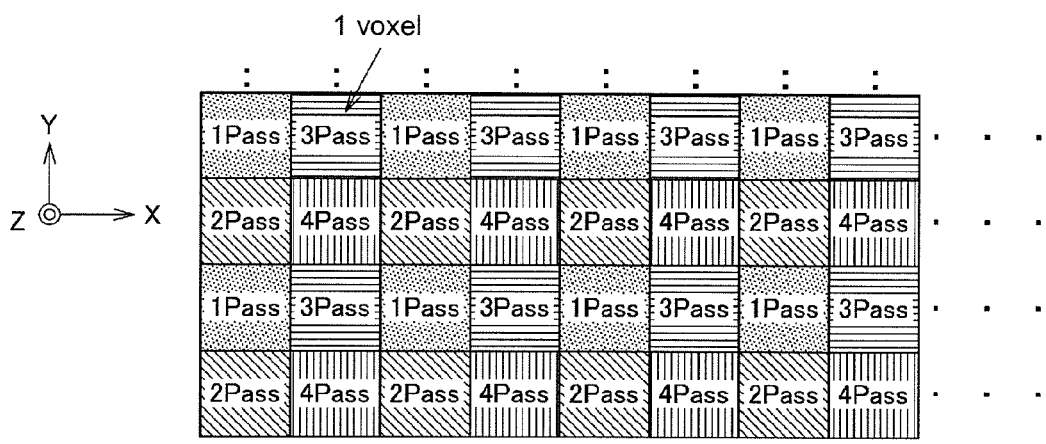
FIGS. 6A and 6B are drawings illustrating a sequential pass technique using a two-dimensional mask where
Figure 6B:
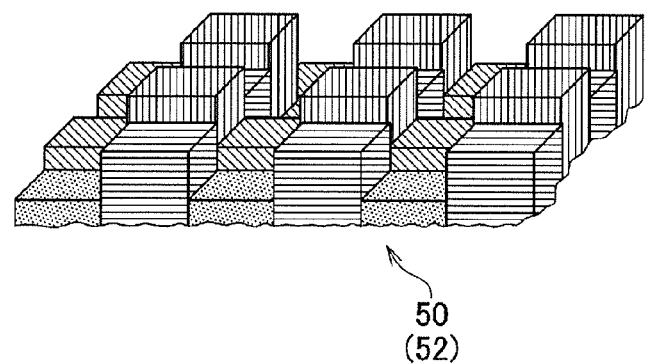

FIGS. 6A and 6B are drawings illustrating the 2D mask-used sequential pass technique. FIG. 6A is a drawing of an exemplified mask used in the 2D mask-used sequential pass technique when four main scans (four passes) are performed based on one piece of slice data. FIG. 6B is an exemplified formed surface of the three-dimensional object 50 currently formed.

The forming operation using the 2D mask-used sequential pass technique discharges the ink droplets, not linearly but per voxel, in each of the main scans through the nozzles toward different positions. The formed surface, therefore, may have projections and depressions formed per voxel, as illustrated in FIG. 6B.

This may also be a suitable means for the formation of fine projections and depressions on the surface of the three-dimensional object 50. The uppermost surface of the three-dimensional object 50 may be similar to the illustration of FIG. 6B. The forming operation thus carried out may successfully prevent the occurrence of the known problem, that is, contour-like patterns that periodically appear correspondingly to the ink layer thicknesses. Further, the projections and depressions thus formed may be smaller in dimension and height, making the contour-like patterns even more inconspicuous than in the sequential line technique.

Unlike the conventional method of forming one ink layer based on one piece of slice data, sharply defined patterns may not appear between any parts of the formed three-dimensional object 50 where different pieces of slice data are used. The three-dimensional object 50 thus formed may also be said to distinctly differ from any three-dimensional objects formed by the conventional method of forming one ink layer based on one piece of slice data.

As thus far described, this embodiment may favorably avoid the occurrence of contour-like streaks, thereby preventing a three-dimensional object from degrading in quality. As a result, a high-quality three-dimensional object may be more successfully formed.

Some additional points to note on this embodiment are described below. This embodiment, by performing a scan in the material-accumulating direction for every main scan combined with the leveling process, may offer more reliable forming operation as an additional advantage. Specifically, by increasing the head-platform distance every time when the leveling process is performed, any unnecessary contact of the leveling roller unit 114 with the three-dimensional object 50 currently formed may be avoidable in the main scans thereafter performed. Then, it may be prevented that the leveling roller contacts and needlessly remove the cured ink.

The description given so far mostly focuses on the effect of preventing the contour-like patterns resulting from stepped parts generated in the material-accumulating direction (Z direction). Forming the fine projections and depressions as described in this embodiment may favorably prevent contour-like patterns from appearing on side surfaces of the three-dimensional object 50 due to stepped parts in the main scanning direction and/or the sub scanning direction. To enhance the effect of preventing such patterns from appearing on the side surfaces, fine projections and depressions similar to those in the material-accumulating direction may preferably be formed in the main scanning direction and/or the sub scanning direction as well.

As described earlier referring to FIGS. 1A and 1B, this embodiment may drive the ultraviolet light sources 112 of the head unit 12 in accordance with an operation mode of the forming apparatus 10. In either one of the operations described referring to FIGS. 4A and 4B, therefore, the ultraviolet light sources 112 may preferably be controlled suitably for the operation.

In the example illustrated in FIG. 4A, it may be an option to turn on the ultraviolet light sources 112 of the head unit 12 (UVLEDs 1 to 3, see FIG. 1B) at all times. Suitable examples of such always-on ultraviolet light sources 112, other than the UVLEDs, may include metal halide lamps.

In the example illustrated in FIG. 4B, for example, the UVLEDs 1 to 3 may be turned on in the backward main scan alone, while being turned off in the forward main scans. Then, the inks discharged in the forward main scan and the inks discharged in the backward main scan may be favorably cured simultaneously.

So far was described performing the main scans, with the head-platform distance being fixed to a certain distance. In this instance, the material-accumulating direction driver 22 may change the head-platform distance at intervals between the main scans. In the modified example of the forming apparatus 10, however, the main scans may be performed, with the head-platform distance being changed.

Figure 7A:
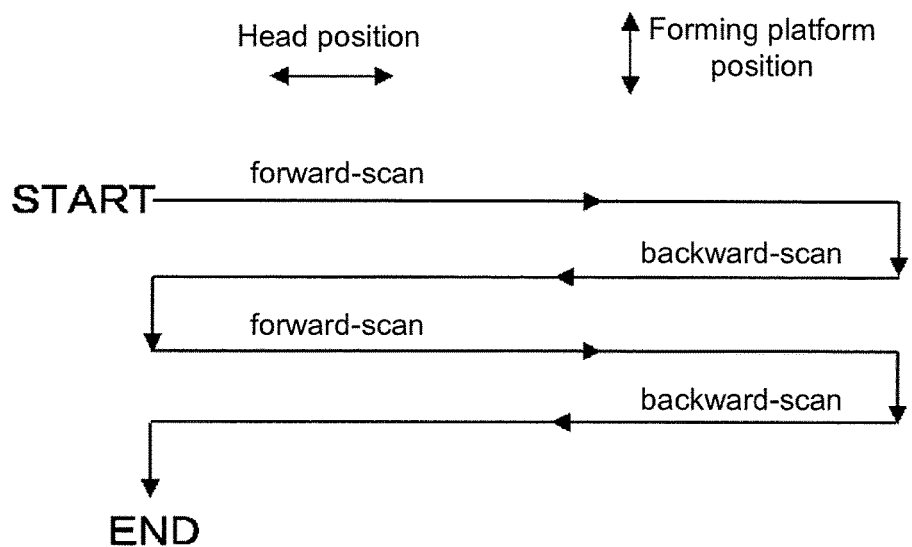
FIGS. 7A and 7B are drawings illustrating how to change a head-platform distance where
Figure 7B:
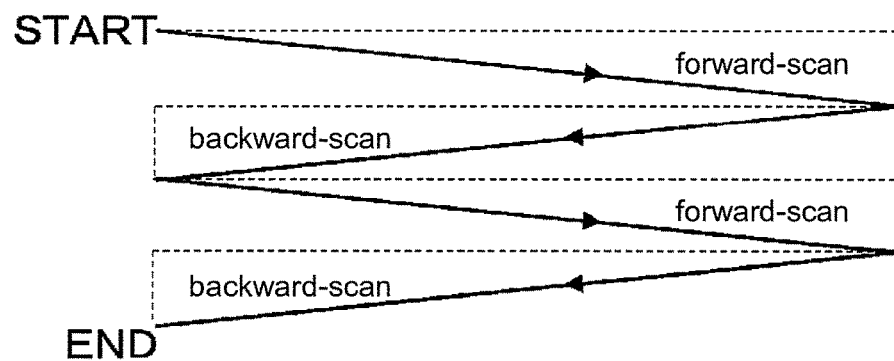

FIGS. 7A and 7B are drawings that illustrate how to change a head-platform distance. FIG. 7A illustrates an example of how to change the head-platform distance, with the head-platform distance being fixed to a certain distance when main scans are performed. FIG. 7A specifically illustrates an example of how to change the head-platform distance when the forming operation is carried out as illustrated in FIG. 4A.

In the drawing, the position of the head unit 12 (see FIGS. 1A and 1B) in the main scanning direction moved during the main scans (head position) are illustrated in the lateral direction. In the drawing, the position of the forming platform 14 (see FIG. 1A) in the material-accumulating direction (Z direction) are illustrated in the vertical direction (forming platform position). In this instance, the material-accumulating direction driver 22 (see FIG. 1A) moves the forming platform 14 to change the head-platform distance. Therefore, position changes of the forming platform illustrated in the drawing are proportional to changes of the head-platform distance.

As described earlier referring to FIG. 4A, the forward and backward main scans are performed in the main scanning direction. The main scans are performed, with the head-platform distance being fixed to a certain distance. Every time when the main scan is performed, the head-platform distance is changed at intervals between the main scans so as to increase by a preset distance. As illustrated in FIG. 7A, therefore, the forming platform is located at a fixed position during the forward and backward main scans, and moved downward at intervals between the main scans.

When the main scans are performed, with the head-platform distance being changed, on the other hand, the head-platform distance may be changed in a different manner. FIG. 7B illustrates an example of how to change the head-platform distance when main scans are performed with the head-platform distance being changed. FIG. 7B specifically illustrates a different example of how to change the head-platform distance when the forming operation is carried out as illustrated in FIG. 4A. In the respect of any matters but the characteristics associated with how to change the head-platform distance, the forming operation may be performed identically or similarly to the illustration of FIG. 4A.

In the operation illustrated in FIG. 7B, the material-accumulating direction driver 22 moves the forming platform 14 downward at a certain rate of movement during the main scans. Thus, the material-accumulating direction driver 22 changes the head-platform distance during the main scans. Specifically, the material-accumulating direction driver 22 successively changes the head-platform distance so as to increase the head-platform distance by degrees. This may ensure steady and suitable changes of the head-platform distance.

As described thus far, the three-dimensional object may be favorably formed in a manner different from the conventional ink layer-based forming method. By changing the head-platform distance at a point in time during the forming operation for one piece of slice data, the contour-like patterns may be effectively prevented from appearing on the surface of a three-dimensional object.

As illustrated in FIG. 7B, the material-accumulating direction driver 22 may preferably keep the same head-platform distance without moving the forming platform 14 at intervals between two of the main scans consecutively performed. This makes it unnecessary to save time for changing the head-platform distance between the main scans consecutively performed. As a result, the forming operation may be more efficiently performed.

In this instance, the leveling process may be performed by the leveling roller unit 114 of the head unit 12 (see FIG. 1B), with the head-platform distance being changed. Assuming that the leveling process is performed in both of the forward and backward main scans, the leveling process is performed in each of the forward and backward main scans when the head unit 12 is oppositely moving. After the leveling process is performed in the forward and backward main scans, the inks leveled in the respective main scans are inclined in opposite directions. Even if streaks resulting from multiple layers may be unavoidable to a certain extent as a result of the leveling process, the streaks are thus randomly inclined and may be even more inconspicuous.

Further, performing the leveling process while increasing the head-platform distance by degrees may succeed in avoiding any unnecessary interference (contact) between the leveling roller and the three-dimensional object 50 currently formed. Then, it may be prevented that the leveling roller contacts and needlessly remove the cured ink.

Assuming that the leveling process is performed in one of the forward and backward main scans alone, interference between the leveling roller and the cured inks may be suitably avoidable likewise. When the leveling process is performed in the backward main scan of the forward and backward main scans alone, a part of the inks already cured in the forward main scan may be moved to a lower position than the leveling roller by the time when the backward main scan starts. Thus, the leveling roller may be prevented from interfering with the inks already cured.

The forming apparatus 10 (see FIG. 1A) may form three-dimensional objects in variously different sizes. To this end, a scan width, that is, distance by which the head unit 12 is moved by the main scan driver 18 (see FIG. 1A) during the main scans, may be set in accordance with the width of a three-dimensional object ready to be formed. Moving the head unit 12 during the main scans may be specifically moving the inkjet heads of the head unit 12 during the main scans. As a result, the main scans may be efficiently performed.

However, when the forming platform 14 is moved at a constant rate in each of the main scans over an entire duration of the main scans, the distance by which the forming platform 14 is moved during one main scan may need to be changed in accordance with the width of the three-dimensional object. On the other hand, the distance by which the forming platform 14 is moved in one main scan is associated with the thickness of inks to be leveled by the leveling roller unit 114. When the distance of movement of the forming platform 14 in one main scan is changed suitably for the width of the three-dimensional object, therefore, the success of the leveling process may be compromised.

A possible option to deal with this issue may be setting an upper-limit value for the distance of movement of the forming platform 14 in one main scan in accordance with the thickness of inks to be leveled and suspending the movement of the forming platform 14 when the moving distance of the forming platform 14 equals to the upper-limit value. This may allow the leveling process to be successfully performed also when the scan width is set suitably for the width of the three-dimensional object. This approach, however, may involve the risk of causing changes between situations of the forming operation when the forming platform 14 is moving and not moving, thereby possibly resulting in a poor forming quality.

When the scan width is set in accordance with the width of the three-dimensional object, therefore, the rate of movement of the forming platform 14, that is, rate of change of the head-platform distance, may preferably be set in accordance with the scan width. The material-accumulating direction driver 22 may preferably set the rate of change of the head-platform distance in accordance with the scan width so as to have the head-platform distance continue to change during the main scans.

This may ensure steady and suitable changes of the head-platform distance during the main scans. By thus setting the scan width in accordance with the width of the three-dimensional object to be framed, the head-platform distance may be more favorably changed.

Generalizing that the main scans are performed while changing the head-platform distance as described so far, the material-accumulating direction driver 22 may move at least one of the forming platform 14 and the head unit 12 so as to increase the head-platform distance during the main scans. This may allow the head-platform distance to be increased synchronously with the discharge of the forming material in the main scans. This may further allow the head-platform distance to be appropriately and efficiently adjusted depending on the progress of the forming operation.

Unlike the conventional ink layer-based forming method, the head-platform distance is thus changed at a point in time during the forming operation performed based on one piece of slice data. Generalizing this configuration, the forming operation may include changing the head-platform distance for each of the main scans, and performing the main scans while changing the head-platform distance. In this instance, the head unit 12 is prompted to perform plural main scans. Then, the material-accumulating direction driver 22 may move at least one of the forming platform 14 and the head unit 12 so as to increase the head-platform distance at least at any one of timings during the plural main scans performed at the same position based on one piece of slice data. This may allow the head-platform distance to appropriately change while performing the plural main scans at the same position based on one piece of slice data.

INDUSTRIAL APPLICABILITY

This disclosure may be usefully applicable to forming apparatuses.

What is claimed is:

1. A forming apparatus for forming a three-dimensional object, comprising:
   a discharge head that discharges a forming material;
   a forming platform disposed at a position so as to face the discharge head, the forming platform being a member in a form of a table that supports the three-dimensional object currently formed;
   a first direction scan driver that drives the discharge head to perform a first direction scan in which the discharge head, while discharging the forming material, moves relative to the forming platform in a first direction previously set; and
   a material-accumulating direction driver that moves at least one of the forming platform and the discharge head in a material-accumulating direction to change a head-platform distance between the discharge head and the forming platform, the material-accumulating direction being a direction in which the forming material discharged from the discharge head is accumulated in layers,
   the material-accumulating direction driver being configured to move at least one of the forming platform and the discharge head during the first direction scan so as to increase the head-platform distance;
   wherein the forming apparatus further comprising:
   a data storage which stores slice data, and
   the slice data representing a cross-sectional shape of the three-dimensional object to be formed,
   the data storage being capable of storing a plurality of pieces of the slice data that respectively represent cross-sectional shapes at different positions in the three-dimensional object in the material-accumulating direction,
   the first direction scan driver being configured to drive the discharge head to perform a plurality of the first direction scans at the same position in the three-dimensional object currently formed based on a respective one of the pieces of the slice data,
   the material-accumulating direction driver being configured to move at least one of the forming platform and the discharge head so as to increase the head-platform distance at least at any one of timings during the plurality of the first direction scans performed at the same position based on one of the pieces of the slice data.

2. The forming apparatus according to claim 1, wherein the material-accumulating direction driver changes the head-platform distance in at least any two first direction scans among the plurality of the first direction scans performed at the same position based on one of the pieces of the slice data, so that the head-platform distance in one of the two first direction scans performed later than the other is greater by a preset distance than the head-platform distance in the other one of the two first direction scans performed earlier than the one.

3. The forming apparatus according to claim 1, further comprising:
   a leveler that levels the forming material discharged from the discharge head in the first direction scan to level out the forming material to a preset height, wherein
   the leveler levels the forming material discharged in at least a part of the plurality of the first direction scans performed at the same position based on one of the pieces of the slice data.

4. The forming apparatus according to claim 2, further comprising:
   a leveler that levels the forming material discharged from the discharge head in the first direction scan to level out the forming material to a preset height, wherein
   the leveler levels the forming material discharged in at least a part of the plurality of the first direction scans performed at the same position based on one of the pieces of the slice data.

5. The forming apparatus according to claim 3, wherein the first direction scan driver drives the discharge head to perform preset N number of the first direction scans at the same position based on one of the pieces of the slice data, where N is an integer greater than or equal to 2,
   the leveler, in M number of the first direction scans among the N number of the first direction scans, levels the forming material discharged in the M number of the first direction scans, where M is an integer greater than or equal to 2 and less than or equal to N, and
   the material-accumulating direction driver changes the head-platform distance so as to increase by a preset distance for each one of the M number of the first direction scans performed.

6. The forming apparatus according to claim 4, wherein
the first direction scan driver drives the discharge head to perform preset N number of the first direction scans at the same position based on one of the pieces of the slice data, where N is an integer greater than or equal to 2,
the leveler, in M number of the first direction scans among the N number of the first direction scans, levels the forming material discharged in the M number of the first direction scans, where M is an integer greater than or equal to 2 and less than or equal to N, and
the material-accumulating direction driver changes the head-platform distance so as to increase by a preset distance for each one of the M number of the first direction scans performed.

7. The forming apparatus according to claim 6, wherein
the material-accumulating direction driver changes the head-platform distance by a distance calculated by dividing a contiguous cross-sectional interval by the M for each one of the M number of the first direction scans performed based on one of the pieces of slice data,
the contiguous cross-sectional interval being used as a term that defines as a pitch between two adjacent cross-sectional shapes represented by two of the pieces of slice data contiguous in the material-accumulating direction.

8. The forming apparatus according to claim 1, wherein
the material-accumulating direction driver changes the head-platform distance for each one of the plurality of the first direction scans performed at the same position based on one of the pieces of the slice data so as to increase the head-platform distance by a substantially constant predetermined distance.

9. The forming apparatus according to claim 7, wherein
the material-accumulating direction driver successively changes the head-platform distance during the first direction scan so as to increase the head-platform distance by degrees.

10. The forming apparatus according to claim 7, wherein
a scan width, a distance by which the discharge head is moved in the first direction scan by the first direction scan driver, is set in accordance with a width of the three-dimensional object to be formed, and
the material-accumulating direction driver sets a rate of change of the head-platform distance depending on the scan width so as to have the head-platform distance continue to change during the first direction scan.

11. The forming apparatus according to claim 7, wherein
the material-accumulating direction driver is configured to not change the head-platform distance at an interval between two of the first direction scans consecutively performed.

12. The forming apparatus according to claim 1, wherein
the forming material is made of an ultraviolet curing ink, and
the discharge head is an inkjet head that discharges ink droplets by inkjet printing technique.

13. The forming apparatus according to claim 1, further comprising:
at least a coloring material for coloring a surface of the three-dimensional object as the forming material, and
the discharge head at least discharges the coloring material.

14. A forming method for forming a three-dimensional object, comprising:
using a discharge head that discharges a forming material and a forming platform disposed at a position so as to face the discharge head, the forming platform being a member in a form of a table that supports the three-dimensional object currently formed;
prompting the discharge head to perform a first direction scan in which the discharge head, while discharging the forming material, moves relative to the forming platform in a first direction previously set;
moving at least one of the forming platform and the discharge head in a material-accumulating direction to change a head-platform distance between the discharge head and the forming platform, the material-accumulating direction being a direction in which the forming material discharged from the discharge head is accumulated in layers; and
moving at least one of the forming platform and the discharge head during the first direction scan so as to increase the head-platform distance;
wherein the forming method further comprising:
storing in a data storage slice data that represents a cross-sectional shape of the three-dimensional object to be formed;
storing in the data storage a plurality of pieces of the slice data that respectively represent cross-sectional shapes at different positions in the three-dimensional object in the material-accumulating direction;
prompting the discharge head to perform a plurality of the first direction scans at the same position in the three-dimensional object currently formed based on a respective one of the pieces of the slice data; and
moving at least one of the forming platform and the discharge head so as to increase the head-platform distance at least at any one of timings during the plurality of the first direction scans performed at the same position based on one of the pieces of the slice data.

15. A forming apparatus for forming a three-dimensional object, comprising:
a data storage which stores slice data, and the slice data representing a cross-sectional shape of the three-dimensional object to be formed;
a discharge head that discharges a forming material;
a forming platform disposed at a position so as to face the discharge head, the forming platform being a member in a form of a table that supports the three-dimensional object currently formed;
a first direction scan driver that drives the discharge head to perform a first direction scan in which the discharge head, while discharging the forming material, moves relative to the forming platform in a first direction previously set;
a material-accumulating direction driver that moves at least one of the forming platform and the discharge head in a material-accumulating direction to change a head-platform distance between the discharge head and the forming platform, the material-accumulating direction being a direction in which the forming material discharged from the discharge head is accumulated in layers;
the material-accumulating direction driver being configured to move at least one of the forming platform and the discharge head during the first direction scan so as to increase the head-platform distance;
a second direction scan driver that moves the discharge head relative to the forming platform in a second direction orthogonal to both the first direction and the material-accumulating direction; and a controller that controls the discharge head, the first direction scan driver, the material-accumulating direction driver and the second direction scan driver,
wherein the controller is configured to control the forming material discharged in the same first direction scanning in units of voxels in the first direction and in the second direction.

* * * * *